(12) United States Patent
Hiraoka et al.

(10) Patent No.: US 10,534,121 B2
(45) Date of Patent: Jan. 14, 2020

(54) HOLOGRAPHIC OPTICAL ELEMENT AND METHOD FOR PRODUCING THE SAME

(71) Applicant: KONICA MINOLTA, INC., Chiyoda-ku Tokyo (JP)

(72) Inventors: Saburou Hiraoka, Kodaira (JP); Kenichi Onaka, Hachioji (JP); Daisuke Watanabe, Niiza (JP); Yuya Kubo, Hino (JP); Kishio Tamura, Hachioji (JP)

(73) Assignee: KONICA MINOLTA, INC., Tokyo (JP)

( * ) Notice: Subject to any disclaimer, the term of this patent is extended or adjusted under 35 U.S.C. 154(b) by 8 days.

(21) Appl. No.: 15/746,940

(22) PCT Filed: Jul. 12, 2016

(86) PCT No.: PCT/JP2016/070553
§ 371 (c)(1),
(2) Date: Jan. 23, 2018

(87) PCT Pub. No.: WO2017/014105
PCT Pub. Date: Jan. 26, 2017

(65) Prior Publication Data
US 2018/0217311 A1   Aug. 2, 2018

(30) Foreign Application Priority Data

Jul. 23, 2015 (JP) ................................. 2015-146066

(51) Int. Cl.
*G02B 5/32* (2006.01)
*G02B 27/01* (2006.01)
(Continued)

(52) U.S. Cl.
CPC ........... *G02B 5/32* (2013.01); *G02B 27/0103* (2013.01); *G02B 27/021* (2013.01); *G03H 1/024* (2013.01); *G03H 1/0465* (2013.01)

(58) Field of Classification Search
CPC .... G02B 27/0103; G02B 27/021; G02B 5/32; G02B 27/01; G02B 27/02; G03H 1/02;
(Continued)

(56) References Cited

U.S. PATENT DOCUMENTS 5,856,048 A   1/1999  Tahara et al.
5,858,614 A * 1/1999  Sato ........................ G03F 7/001
                                                          359/3
(Continued)

FOREIGN PATENT DOCUMENTS

EP    2889700 A1    7/2015
JP    H06301322 A   10/1994
(Continued)

OTHER PUBLICATIONS

International Search Report corresponding to Application No. PCT/JP2016/070553; dated Nov. 29, 2016.
(Continued)

*Primary Examiner* — William R Alexander
*Assistant Examiner* — Balram T Parbadia
(74) *Attorney, Agent, or Firm* — Cantor Colburn LLP

(57) ABSTRACT

The present invention provides a means for suppressing an occurrence of a ghost by enhancing diffraction efficiency of a holographic optical element having a volume hologram recording layer. The present invention is a holographic optical element including: a volume hologram recording layer containing a photopolymer; and at least one adjacent layer which is in contact with the volume hologram recording layer and contains a resin, wherein a diffraction grating
(Continued)

is formed so as to extend from the volume hologram recording layer to the adjacent layer.

14 Claims, 2 Drawing Sheets

(51) Int. Cl.
    *G02B 27/02*     (2006.01)
    *G03H 1/02*     (2006.01)
    *G03H 1/04*     (2006.01)

(58) Field of Classification Search
CPC .... G03H 1/024; G03H 1/0248; G03H 1/0256; G03H 1/0272; G03H 1/0465; G03H 2001/0439; G03H 2250/12; G03H 2250/37; G03H 2260/12; G03H 2270/10; G11B 7/24044; G11B 7/245
See application file for complete search history.

(56) References Cited

U.S. PATENT DOCUMENTS

| | | | | |
|---|---|---|---|---|
| 6,495,295 | B1* | 12/2002 | Shioda | G03H 1/0252 359/2 |
| 8,900,775 | B2 | 12/2014 | Hayashida et al. | |
| 2002/0004172 | A1* | 1/2002 | Maeda | C03C 1/008 430/1 |
| 2003/0231394 | A1* | 12/2003 | Kimura | G09F 13/16 359/558 |
| 2013/0163082 | A1* | 6/2013 | Tamada | G02B 5/3083 359/489.07 |
| 2013/0342885 | A1* | 12/2013 | Kono | G02B 5/32 359/15 |
| 2014/0376575 | A1* | 12/2014 | Kono | H01S 3/2308 372/18 |
| 2015/0212487 | A1 | 7/2015 | Azakami et al. | |

FOREIGN PATENT DOCUMENTS

| | | |
|---|---|---|
| JP | 2014044239 A | 3/2014 |
| JP | 2014215410 A | 11/2014 |

OTHER PUBLICATIONS

Written Opinion of the International Searching Authority corresponding to Application No. PCT/JP2016/070553; dated Nov. 29, 2016.

Extended European Search Report corresponding to Application No. 16827665.7-1210/3327472 PCT/JP2016070553; dated May 28, 2018.

JPO Notice of Reasons for Refusal corresponding to Application No. JP2017-529562; dated Oct. 8, 2019.

\* cited by examiner

HOLOGRAPHIC OPTICAL ELEMENT AND METHOD FOR PRODUCING THE SAME

CROSS REFERENCE TO RELATED APPLICATIONS:

The present U.S. patent application is a U.S. National Phase Application under 35 USC 371 of International Application PCT/JP2016/070553, filed on Jul. 12, 2016. Priority under 35U.S.C § 119(a) and 35 U.S.C. § 365(b) is claimed from Japanese Application No. 2015-146066 filed on Jul. 23, 2015, the entirety of which is incorporated herein by references.

TECHNICAL FIELD

The present invention relates to a holographic optical element and a method for producing the same.

BACKGROUND ART

A holographic optical element having a volume hologram recording layer functions as a light combiner and is applied to an optical lens, a display element, or the like, and thus there is increasing demand for it. In particular, a holographic optical element as a display element of head-mounted display or head-up display has high transparency of a volume hologram recording layer, and thus it can be used as a display element of a see-through type (for example, JP 2014-215410 A).

Being accompanied with the increasing demand or diversified uses, the holographic optical element is required to have higher performance and quality items are becoming more diversified. For a display element of see-through type, high diffraction efficiency of a volume hologram recording layer is required to display information light in the presence of external light (background). Furthermore, in order to display information with good accuracy, it is required to avoid an occurrence of a ghost by suppressing unnecessary light reflection within a display element.

Production of a volume hologram recording layer is generally achieved by face-to-face exposure (interference exposure) of a photosensitive layer which is sandwiched between a pair of transparent supports and obtained by coating and drying of a photosensitive composition containing polymerizable monomer with coherent light source, and forming a diffraction grating consisting of areas with high refractive index and low refractive index by allowing an occurrence of polymerization reaction in the photosensitive layer according to interference wave (for example, JP 6-301322 A).

SUMMARY OF INVENTION

However, although the photosensitive composition for a volume hologram recording layer described in the above JP 6-301322 A is excellent in terms of diffractive index modulation for enhancing diffraction efficiency, there is a problem that, as the holographic optical element obtained by sandwiching between a pair of transparent supports has insufficient diffraction efficiency, ghosting may easily occur when it is used as a display element.

Accordingly, an object of the present invention is to provide a means for suppressing an occurrence of a ghost by enhancing diffraction efficiency of a holographic optical element having a volume hologram recording layer.

Inventors of the present invention conducted intensive studies. As a result, it was found that the above problem can be solved by a holographic optical element in which a diffraction grating is formed so as to extend to an adjacent layer that is provided to be in contact with a volume hologram recording layer, and the present invention is completed accordingly.

That is, the present invention is a holographic optical element including: a volume hologram recording layer containing a photopolymer; and at least one adjacent layer which is in contact with the volume hologram recording layer and contains a resin, wherein a diffraction grating is formed so as to extend from the volume hologram recording layer to the adjacent layer.

BRIEF DESCRIPTION OF DRAWINGS

In FIG. 1, reference sign 10 represents a holographic optical element, reference sign 11 represents a volume hologram recording layer, and reference sign 12 represents an adjacent layer, respectively.

In FIG. 2, reference sign 1 represents a volume hologram recording layer, reference sign 2 represents an adjacent layer, reference sign 3 represents an extended line from the end of an adjacent layer, and reference sign 4 represents a diffraction grating, respectively.

In FIG. 3, reference sign 11 represents a volume hologram recording layer, reference sign 12 represents an adjacent layer, reference sign 103 represents a silicone adhesive, and reference sign 104 represents a glass prism base, respectively.

In FIG. 4, reference sign 201 represents a laser beam source, reference sign 202 represents a beam steerer, reference sign 203 represents a shutter, reference sign 204 represents a beam expander, reference sign 205 represents a beam splitter, reference sign 206, reference sign 207, reference sign 208, and reference sign 209 represent a mirror, reference sign 211 and reference sign 212 represent a spatial filter, and reference sign 213 represents a production optical system, respectively.

DESCRIPTION OF EMBODIMENTS

Figure 1:
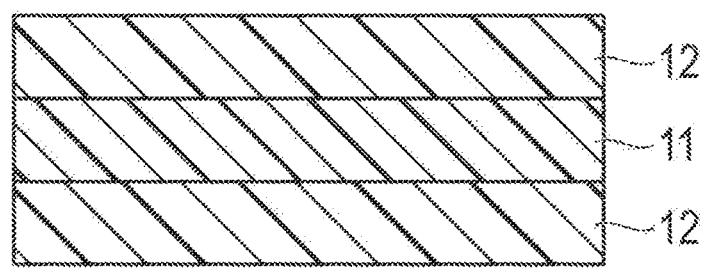
FIG. 1 is a schematic cross-sectional view illustrating the typical configuration of a holographic optical element.

Hereinbelow, explanations are given for the holographic optical element as one embodiment of the present invention.

Furthermore, hereinbelow, a layer containing a polymerizable monomer before holographic exposure (interference exposure) is referred to as a photosensitive layer, and a layer having a volume hologram recorded therein by performing holographic exposure for a photosensitive layer is referred to as a volume hologram recording layer. Furthermore, a resin composition which is obtained by a polymerization according to application of light irradiation (that is, photocured) to a photosensitive composition containing a polymerizable monomer, a photopolymerization initiator, and a matrix resin or a precursor thereof is referred to as a photopolymer.

The holographic optical element of the present embodiment has a volume hologram recording layer containing a photopolymer and at least one adjacent layer which is in contact with the volume hologram recording layer and contains a resin, in which a diffraction grating is formed so as to extend from the volume hologram recording layer to the adjacent layer. The holographic optical element of the present embodiment having this configuration has enhanced diffraction efficiency so that an occurrence of ghost is suppressed.

Although detailed reasons for obtaining the above effect by the holographic optical element of the present embodiment remain unclear, the following mechanism may be considered.

It is believed that a diffraction grating having a high refractive index region and a low refractive index region is formed in a volume hologram recording layer due to the following phenomenon occurring in a photosensitive layer. Namely, when holographic exposure is carried out, polymerization of a polymerizable monomer in the photosensitive layer is promoted in the exposure part, and thus diffusive movement of a polymerizable monomer occurs such that an interface between the polymerizable monomer and other component is minimized as small as possible, and at the same time, the polymerization occurs additionally. Accordingly, in the photosensitive layer, the photopolymer region and region of other component formed by the polymerization are formed with the same pattern as the interference wave irradiated by holographic exposure. In addition, as there is a difference in refractive index between the photopolymer region and region of other component, a high refractive index region and a low refractive index region are formed in accordance with interference wave, resulting in forming of a diffraction grating (hologram) in a volume hologram recording layer.

In general, those polymerization and diffusive movement phenomenon are not likely to occur near an interface between a photosensitive layer and an adjacent layer, and thus a decrease in diffraction efficiency may be easily caused.

However, by selecting the properties of an adjacent layer as described below, the diffraction grating is formed so as to extend from the volume hologram recording layer to the adjacent layer, and thus the volume occupied by the diffraction grating is increased. It is believed that the diffraction efficiency is enhanced due to such reasons.

Furthermore, as the diffraction grating formed so as to extend to the adjacent layer yields an unclear interface between a volume hologram recording layer and an adjacent layer, interfacial light reflection hardly occurs, and thus it is also possible that an occurrence of a ghost is suppressed when the holographic optical element is used as an image element.

Furthermore, the aforementioned mechanism is based on presumption, and the holographic optical element of the present embodiment is not limited by the aforementioned mechanism at all.

Hereinbelow, preferred embodiments are explained in greater detail, but they are not limited to the following embodiments only.

In the present specification, the expression "X to Y" representing a range means "X or more and Y or less" including both X and Y. Furthermore, unless specifically described otherwise, operations and measurement of physical properties or the like are carried out at conditions including room temperature (20 to 25° C.)/relative humidity of 40 to 50% RH.

[Whole Configuration of Holographic Optical Element]

First, explanations are given for whole configuration of the holographic optical element of the present embodiment.

FIG. 1 is a schematic cross-sectional view illustrating the typical configuration of the holographic optical element of the present embodiment. A holographic optical element 10 includes a volume hologram recording layer 11 and a pair of the adjacent layers 12. The holographic optical element shown in FIG. 1 has a pair of the adjacent layers 12 provided such that it can be in contact with both surfaces of the volume hologram recording layer 11, but it is also possible to have a configuration in which the adjacent layer 12 is provided only on a single surface of the volume hologram recording layer 11.

Figure 2:
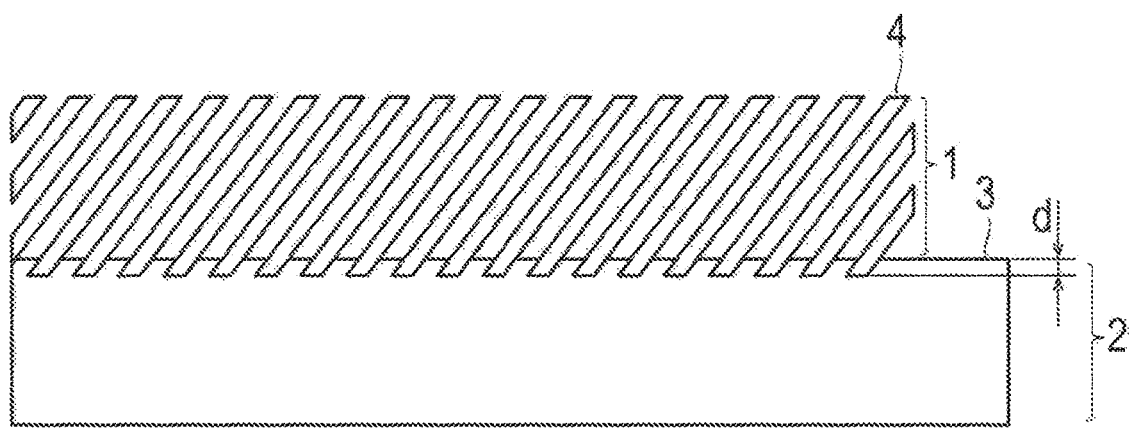
FIG. 2 is a schematic view illustrating an exemplary method for measuring the length of a diffraction grating that is formed on an adjacent layer side.

According to the holographic optical element of the present embodiment, a diffraction grating is formed so as to extend from the volume hologram recording layer to the adjacent layer. Forming of a diffraction grating so as to extend to an adjacent layer can be determined by a method described below, for example. FIG. 2 is a schematic view illustrating an exemplary method for measuring the length of a diffraction grating that is formed on an adjacent layer side.

First, a holographic optical element 5 is produced such that an adjacent layer 2 has a larger area than a volume hologram recording layer 1. The holographic optical element 5 is cut such that an interface between the volume hologram recording layer 1 and the adjacent layer 2 is exposed. Cutting is carried out, after freeze-drying of the holographic optical element 5 with liquid nitrogen, by using a microtome. Accordingly, exposure can be made without disrupting a state near an interface between the volume hologram recording layer 1 and the adjacent layer 2. The exposed surface is observed under a transmission electron microscope (TEM), and an extended line 3 is drawn from an end part of the adjacent layer 2 to an interface between the volume hologram recording layer 1 and the adjacent layer 2. With regard to the extended line 3, if a diffraction grating 4 is formed on the adjacent layer 2 side, it can be regarded as a holographic optical element of the present embodiment.

The length of the diffraction grating 4 on the adjacent layer 2 side, that is, the length d between the extended line 3 and the end part of the diffraction grating 4, can be obtained by measurement also by TEM for 100 diffraction gratings that are randomly selected and calculation from a mean value of the measurements.

In the present embodiment, the length d of the diffraction grating 4 on the adjacent layer 2 side is, although not particularly limited, preferably 1 nm or more, and more preferably 10 nm or more. Furthermore, the upper limit of the length d of the diffraction grating 4 is, although not particularly limited, preferably 50 nm or less, and more preferably 30 nm or less.

Furthermore, In the case of a holographic optical element in which an adjacent layer is formed on both surfaces of a volume hologram recording layer, it is favorable that a diffraction grating is formed so as to extend to at least one adjacent layer.

In order to obtain such a holographic optical element of the present embodiment in which a diffraction grating is formed so as to extend to an adjacent layer with good efficiency, a method of controlling the density of an adjacent layer, a method of modifying affinity or compatibility of an adjacent layer for the polymerizable monomer contained in a photosensitive layer, or the like can be mentioned.

[Adjacent Layer]

The adjacent layer contains a resin as a base material. The adjacent layer may be provided such that it is in contact with both surfaces of a volume hologram recording layer, or in contact with only one surface of a volume hologram recording layer. Namely, it is sufficient that the holographic optical element of the present embodiment has at least one adjacent layer which is in contact with a volume hologram recording layer and contains a resin. When the adjacent layer is provided on both surfaces of a volume hologram recording layer, constitutional materials and thickness of each adjacent layer may be the same or different from each other.

In order to obtain the holographic optical element of the present embodiment in which a diffraction grating is formed so as to extend to an adjacent layer with good efficiency, it is preferable to control the density of an adjacent layer. Specifically, the density of an adjacent layer is preferably 1.20 to 1.38 g/cm³, and more preferably 1.30 to 1.35 g/cm³. As the density is within this range, a photosensitive composition used for forming a volume hologram recording layer described below or a photosensitive layer obtained by coating and drying the photosensitive composition can easily infiltrate an adjacent layer so that a diffraction grating can be easily formed so as to extend to an adjacent layer, in which the diffraction grating is formed by holographic exposure. Accordingly, the diffraction efficiency is further enhanced, and thus an occurrence of a ghost can be further suppressed.

Furthermore, the density of an adjacent layer can be measured by a method according to the density gradient column method (JIS K-7112-1999). Specifically, the density is calculated according to the following method.

In a bath filled with liquid medium having density gradient, a glass ball with known density is immersed, and immersion density is measured according to the buoyancy of the ball. The same operation is performed for other glass ball with different density, and a calibration curve showing the relationship of depth vs. density is established. Subsequently, the adjacent layer according to the present embodiment is immersed in the same bath, immersion depth is determined, and the density of the adjacent layer is calculated by using the calibration curve.

The measurement based on the density gradient column method described above can be made by using a device for measuring specific gravity which is manufactured by Shibayama Scientific Co., Ltd.

<Resin>

As for the resin included in an adjacent layer, a known resin with transparency can be used. Specific examples thereof include polyolefin such as polyethylene or polypropylene, an acrylic resin such as polymethyl methacrylate (methyl polymethacrylate), cellulose acylate, an acetal resin, polycarbonate, polyurethane, and polyvinyl alcohol. These resins may be used either singly or as a mixture of two or more of them.

Among them, from the viewpoint of having excellent optical properties and easy control of the density of an adjacent layer to the above range, cellulose acylate is preferable.

The glucose unit which forms β-1,4 bond to constitute cellulose has a free hydroxyl group at position 2, position 3, and position 6. The cellulose acylate is a polymerized product (polymer) in which part or all of those hydroxyl groups are acylated with an acyl group. Substitution degree of acylate group indicates the total esterification ratio of cellulose at position 2, position 3, and position 6 of a repeating unit. Specifically, when each hydroxy group of the position 2, position 3, and position 6 of cellulose is 100% esterified, each is determined to have substitution degree of 1. Thus, when all of the position 2, position 3, and position 6 of cellulose are 100% esterified, the substitution degree has the maximum value of 3. The substitution degree of acylate group can be measured based on ASTM-D817-96.

Examples of the acyl group include an acetyl group, an n-propionyl group, an isopropionyl group, an n-butanoyl group, an isobutanoyl group, a t-butanoyl group, a pentanoyl group, a hexanoyl group, a heptanoyl group, an octanoyl group, a decanoyl group, a dodecanoyl group, a tridecanoyl group, a tetradecanoyl group, a hexadecanoyl group, an octadecanoyl group, a cyclohexanecarbonyl group, an oleoyl group, a benzoyl group, a naphthylcarbonyl group, a cinnamoyl group, and an aromatic acyl group represented by the following general formula (I).

[Chemical Formula 1]

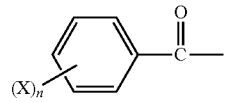

General Formula (I)

In the above general formula (I), X represents a methyl group, an ethyl group, an n-propyl group, an isopropyl group, an n-butyl group, an isobutyl group, a t-butyl group, a pentyl group, a hexyl group, a heptyl group, or an octyl group, n is an integer of from 1 to 5, and when n is 2 or higher, a plurality of X may be linked to each other to form a ring.

Among those acyl groups, from the viewpoint of easy control of the density of an adjacent layer to the above suitable range, an acetyl group, an n-propionyl group, an n-butanoyl group, a t-butanoyl group, a dodecanoyl group, an octadecanoyl group, an oleoyl group, a benzoyl group, a naphthylcarbonyl group, a cinnamoyl group, and an aromatic acyl group represented by the above general formula (I) are more preferable. An acetyl group, an n-propionyl group, an n-butanoyl group, a t-butanoyl group, a benzoyl group, and an aromatic acyl group represented by the above general formula (I) are even more preferable, and an acetyl group is particularly preferable.

From the viewpoint of easy control of the density of an adjacent layer to the above suitable range, or the like, the substitution degree of an acetyl group of cellulose acylate is preferably 1.75 to 2.68, and more preferably 2.40 to 2.65.

Cellulose acylate having an acetyl group may be substituted with, as long as the suitable density range of an adjacent layer described above is satisfied, other acyl group such as an n-propionyl group, an isopropionyl group, an n-butanoyl group, a t-butanoyl group, or a benzoyl group other than an acetyl group. When there is an acyl group other that those acyl groups, the substitution degree of other acyl group is preferably 0.01 to 0.6. With such substitution degree, the density of an adjacent layer can be easily controlled to the above preferred range.

Among those other acyl groups, a benzoyl group is particularly preferable in that it exhibits favorable compatibility with an aromatic ring of a polymerizable monomer that is contained in the photosensitive layer. Thus, cellulose acylate having a benzoyl group is preferable from the viewpoint in that it allows highly efficient exhibition of the diffusive movement phenomenon of a polymerizable monomer or the like in an adjacent layer and, by further enhancing the diffraction efficiency, further suppresses an occurrence of a ghost. Namely, it is preferable that the cellulose acylate contains a benzoyl group.

Weight average molecular weight (Mw) of cellulose acylate is, from the viewpoint of having homogeneous optical properties, productivity, and processability, preferably in the range of 75000 to 280000, and more preferably in the range of 100000 to 240000.

Furthermore, the weight average molecular weight (Mw) of cellulose acylate can be measured at the following measurement conditions by using gel permeation chromatography (GPC).

Solvent: methylene chloride
Column: Shodex (registered trademark) K806, K805, K803G (three products of Showa Denko K.K. were used after connecting them to each other)
Column temperature: 25° C.
Sample concentration: 0.1% by mass
Detector: RI Model 504 (product of GL Science Inc.)
Pump: L6000 (product of Hitachi, Ltd.)
Flow rate: 1.0 ml/min
Calibration curve: calibration curve established by using 13 samples of standard polystyrene, STK standard polystyrene (product of Tosoh Corporation) with Mw=1000000 to 500, was used. Thirteen samples were used at almost the same interval.

The adjacent layer may contain, within a range in which the density, optical properties, and the like are not impaired, a component other than the aforementioned resin. For example, other components including a resin component such as cycloolefin resin or fluorine-containing resin, a UV absorbing agent, an anti-oxidation agent, an anti-degradation agent, a photostabilizer, a heat stabilizer, a lubricating agent, a plasticizer, an anti-static agent, an anti-flame agent, a filler, microparticles, or an optical property modifying agent may be contained. The addition amount of other component (when two or more components are added, total amount of the components) is preferably 0.1 to 25% by mass relative to the total mass of an adjacent layer.

The shape of an adjacent layer may be a layer shape like a film shape and plate shape, or a base shape also functioning as a prism. In the case of a layer shape, it can be processed by cutting, and thus there is a convenience that it can be applied to various kinds of an optical element.

When the adjacent layer has a layer shape, the thickness is, although not particularly limited, preferably 10 to 1000 μm, and more preferably 50 to 200 μm.

[Method for Forming Adjacent Layer]

The method for forming an adjacent layer in a layer shape like a film shape is not particularly limited, and any conventionally known method including a melt extrusion method, a solution casting method (solution casting), a calendaring method, a compression molding method or the like can be used. Among those methods, a melt extrusion method and a solution casting method (solution casting) are preferable.

As for the melt extrusion method, a method of melt-kneading a resin, and, if necessary, other components followed by molding into a film shape by melt extrusion can be mentioned. The kneader used for kneading is not particularly limited, and a conventionally known kneader including an extruder such as a monoaxial extruder or a biaxial extruder, and a pressure kneader can be used. Furthermore, as for the melt extrusion method for molding into a film shape, a T die method and an inflation method can be mentioned. The molding temperature for melt extrusion cannot be generally said as it varies depending on the type of a resin. However, it is preferably 150 to 350° C. In the case of molding onto a film by T die method, by mounting a T die on a tip part of a known monoaxial extruder or a biaxial extruder and winding a film extruded in a film shape, a film can be obtained in a roll shape. At that time, by suitably modifying the temperature of a winding roll and further stretching in an extrusion direction, it is possible to have a monoaxial stretching step. Furthermore, by adding a step of stretching a film in a direction perpendicular to the extrusion direction, a step like sequential biaxial stretching and simultaneous biaxial stretching can be also added. Furthermore, to stabilize optical anisotropy or mechanical properties of a film, it is possible to perform a heat treatment (annealing) or the like after stretching treatment.

Furthermore, as for the solution casting method (solution casting), a method of preparing a solution or a dispersion (dope) containing a resin, and, if necessary, other components followed by performing casting can be mentioned.

The solvent used for a solution casting method (solution casting) is, although not particularly limited, a chlorine-based solvent such as chloroform or methylene chloride; an aromatic solvent such as toluene, xylene, benzene, and a mixed solvent thereof; an alcohol-based solvent such as methanol, ethanol, n-propanol, 2-propanol, n-butanol, sec-butanol, t-butanol, 2,2,2-trifluoroethanol, 2,2,3,3-tetrafluoro-1-propanol, 1,3-difluoro-2-propanol, 1,1,1,3,3,3-hexafluoro-2-methyl-2-propanol, 1,1,1,3,3,3-hexafluoro-2-propanol, or 2,2,3,3,3-pentafluoro-1-propanol; methyl cellosolve, ethyl cellosolve, butyl cellosolve, dimethyl formamide, dimethyl sulfoxide, 1,3-dioxolane, 1,4-dioxane, cyclohexanone, tetrahydrofuran, acetone, methyl ethyl ketone (MEK), methyl acetate, ethyl acetate, amyl acetate, diethyl ether, and nitroethane. Those solvents may be used either singly or in combination of two or more kinds thereof. As for the device for carrying out a solution casting method (solution casting), a stainless band, a drum type casting machine, a band type casting machine, and a spin coater can be mentioned.

With regard to the solution casting method (solution casting), an adjacent layer is formed preferably by carrying out the film forming based on a method which includes a step of casting a dope on the aforementioned device, a step of drying the cast dope using a web, a step of peeling the web from the device after drying, a step of stretching or maintaining the width, and a step of further drying, or the like.

As a method for forming an adjacent layer in a base shape, an injection molding method can be used. Manufacture of a base based on injection molding consists of melt kneading of components for an adjacent layer, injection from a kneader to a mold, and cooling in the mold and recovery of a base.

For the melt kneading of a resin and other components, a conventionally known kneader such as a monoaxial extruder or a biaxial extruder, and a pressure kneader can be used. At that time, to ensure the homogeneous property of a kneaded product, it is preferable to carry out the melt kneading with heating at a temperature which is higher than the glass transition temperature (Tg) of a resin.

From the viewpoint of ensuring molding degree and ensuring optical properties of a molded product, control of an injection amount of a kneaded product and the temperature of a mold is important. The injection amount can be controlled based on the pressure amount from a kneader to a mold, the diameter of an inner as a passage of a kneaded product to a mold, and the temperature applied to an inner or the like. The mold temperature at the time of injection of a kneaded product is preferably set such that it is the same or lower than the Tg of a resin. Accordingly, the size accuracy can be obtained. Furthermore, to ensure the optical properties, preferred temperature for cooling is within a range of Tg of a resin or lower to Tg−100° C. More preferably, it is within a range of Tg of a resin or lower to Tg–50° C. It is even more preferably within a range of Tg of a resin or lower to Tg–20° C.

[Volume Hologram Recording Layer]

The volume hologram recording layer is produced by carrying out at least holographic exposure for a coating film (photosensitive layer), which is obtained by coating the aforementioned adjacent layer with a photosensitive composition containing a polymerizable monomer, a photopolymerization initiator, and a matrix resin or a precursor thereof followed by drying, to form in the photosensitive layer a diffraction grating consisting of a high refractive index region and a low refractive index region.

The photosensitive composition used for forming a volume hologram recording layer may contain, other than a radical polymerizable monomer, a photopolymerization initiator, and a matrix forming material, a sensitizing agent, a solvent, or the like. Those components are explained hereinbelow.

<Radical Polymerizable Monomer>

As for the radical polymerizable monomer, those exhibiting relatively high refractive index are preferable, and examples thereof include acrylamide, methacrylamide, methylene bisacrylamide, polyethylene glycol diacrylate, trimethylol propanetriacrylate, pentaerythritoltriacrylate, dipentaerythritolhexaacrylate, 2,3-dibromopropyl acrylate, dicyclopentanyl acrylate, dibromoneopentyl glycol diacrylate, 2-phenoxyethyl acrylate, 2-phenoxymethyl methacrylate, phenolethoxylate monoacrylate, 2-(p-chlorophenoxy) ethyl acrylate, p-chlorophenyl acrylate, phenyl acrylate, 2-phenylethyl acrylate, 2-(1-naphthyloxy) ethyl acrylate, o-biphenyl methacrylate, o-biphenyl acrylate, styrene, methoxystyrene, benzyl acrylate, phenyl acrylate, 2-phenylethyl acrylate, 2-phenoxyethyl acrylate, 2-phenoxyethyl methacrylate, phenolethoxylate acrylate, methylphenoxyethyl acrylate, nonylphenoxyethyl acrylate, 2-hydroxy-3-phenoxypropyl acrylate, phenoxypolyethylene glycol acrylate, 1,4-benzene diol dimethacrylate, 1,4-diisopropenylbenzene, 1,3,5-triisopropenylbenzene, benzoquinone monomethacrylate, 2-(1-naphthyloxy)ethyl acrylate, 2,3-naphthalene dicarbonic acid (acryloxyethyl) monoester, di(3-methacryloxy-2-hydroxypropyl)ether of diphenolic acid, β-acryloxyethyl hydrogen phthalate, 2,2-di (p-hydroxyphenyl)propanediacrylate, 2,3-di(p-hydroxyphenyl)propane dimethacrylate, 2,2-di(p-hydroxyphenyl)propane dimethacrylate, polyoxyethylene-2,2-di(p-hydroxyphenyl)propane dimethacrylate, di(2-methacryloxyethyl)ether of bisphenol A, ethoxyated bisphenol A diacrylate, di(3-acryloxy-2-hydroxypropyl) ether of bisphenol A, di(2-acryloxyethyl)ether of bisphenol A, 2,2-bis(4-acryloxyethoxyphenyl)propane, 2,2-bis(4-methacryloxyethoxyphenyl)propane, 2,2-bis(4-acryloxydiethoxyphenyl)propane, 2,2-bis(4-methacryloxydiethoxyphenyl)propane, bis(4-acryloxydiethoxyphenyl)methane, bis(4-methacryloxydiethoxyphenyl)methane, 2-chlorostyrene, 2-bromostyrene, 2-(p-chlorophenoxy)ethyl acrylate, di(3-acryloxy-2-hydroxypropyl)ether of tetrachloro-bisphenol A, di(2-methacryloxyethyl)ether of tetrachloro-bisphenol A, di(3-methacryloxy-2-hydroxypropyl)ether of tetrabromo-bisphenol A, di(2-methacryloxyethyl)ether of tetrabromobisphenol A, bis(4-acryloxyethoxy-3,5-dibromophenyl)methane, bis(4-methacryloxyethoxy-3,5-dibromophenyl)methane, 2,2-bis(4-acryloxyethoxy-3,5-dibromophenyl)propane, 2,2-bis(4-methacryloxyethoxy-3,5-dibromophenyl)propane, bis(4-acryloxyethoxyphenyl) sulfone, bis(4-methacryloxyethoxyphenyl)sulfone, bis(4-acryloxydiethoxyphenyl)sulfone, bis(4-methacryloxydiethoxyphenyl)sulfone, bis(4-acryloxypropoxy-3,5-dibromophenyl)sulfone, bis(4-methacryloxypropoxy-3,5-dibromophenyl)sulfone, diethylene dithioglycol diacrylate, diethylene dithioglycol dimethacrylate, triphenylmethylthioacrylate, 2-(tricyclo[5,2,1,0$^{2,6}$]dibromodecylthio)ethyl acrylate, S-(1-naphthylmethyl)thioacrylate, a compound containing ethylenically unsaturated bond which contains at least two S atoms in the molecule described in JP 2-247205 A or JP 2-261808 A, N-vinylcarbazole, 2-(9-carbazolyl)ethyl acrylate, 2-[β-(N-carbazolyl)propionyloxy]ethylacrylate, 2-naphthyl acrylate, pentachlorophenyl acrylate, 2,4,6-tribromophenyl acrylate, 2-(2-naphthyloxy)ethyl acrylate, N-phenylmaleimide, p-biphenyl methacrylate, 2-vinylnaphthalene, 2-naphthyl methacrylate, 2,3-naphthalene dicarbonic acid (2-acryloxyethyl) (3-acryloxypropyl-2-hydroxy)diester, N-phenylmethacrylamide, t-butylphenyl methacrylate, diphenic acid (2-methacryloxyethyl)monoester, diphenic acid (2-acryloxyethyl)(3-acryloxypropyl-2-hydroxy)diester, 4,5-phenanthrene dicarbonic acid (2-acryloxyethyl)(3-acryloxypropyl-2-hydroxy)diester, and 2-{{[3-(methylsulfanyl) phenyl]carbamoyl}oxy}ethylprop-2-enoate.

Furthermore, a compound having 9,9-diarylfluorene skeleton and at least one ethylenically unsaturated bond in the molecules can be mentioned. Specifically, it is a compound having the following structure.

[Chemical Formula 2]

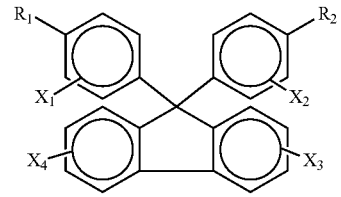

Herein, $R_1$ and $R_2$ are each independently a radical polymerizable group which contains an acryloyl group or a methacryloyl group at the terminal. Preferred is a group which has an acryloyl group or a methacryloyl group at the terminal, and can bind to the benzene ring of the aforementioned compound via an oxyethylene chain, an oxypropylene chain, a urethane bond, an amide bond, or the like.

Furthermore, $X_1$ to $X_4$ are each independently a hydrogen atom or a substituent group. Specific examples of the substituent group include an alkyl group with 1 to 4 carbon atoms, an alkoxy group with 1 to 4 carbon atoms, an amino group, a dialkylamino group, a hydroxyl group, a carboxy group, and a halogen atom.

Furthermore, urethane acrylate consisting of a condensate between a phenylisocyanate compound and a compound which has an ethylenically unsaturated bond like hydroxyl group and acryloxy group in one molecule can be also used. Specifically, it is a compound having the following structure.

[Chemical Formula 3]

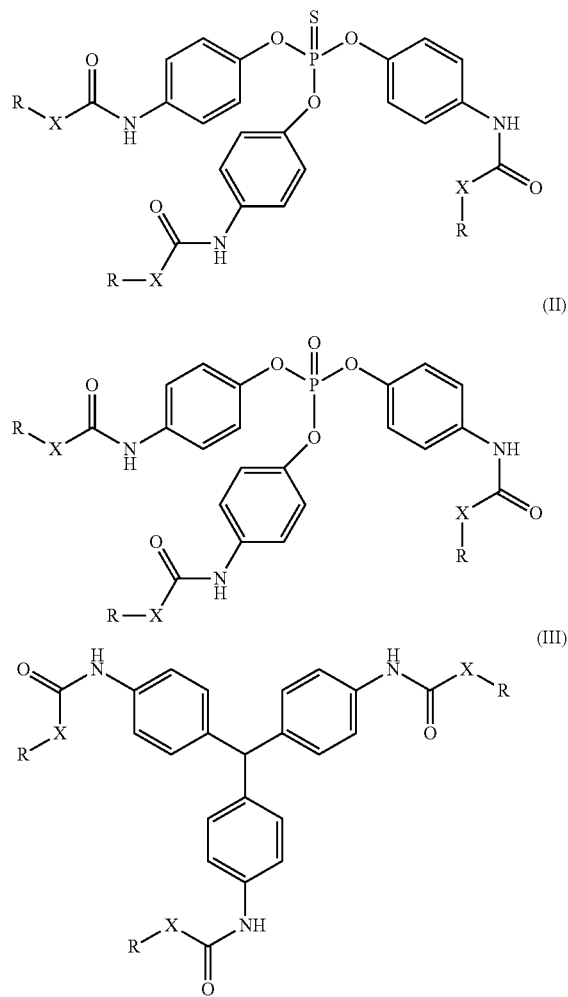

In the above general formulae (I) to (III), R is each independently a group having an ethylenically unsaturated bond, and X is each independently a single bond, an oxygen atom, or a linear, branched, or cyclic divalent aliphatic hydrocarbon group.

Furthermore, a compound having a structure represented by the following general formula (IV) can be also used.

[Chemical Formula 4]

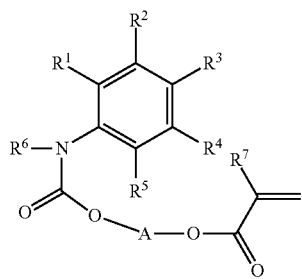

In the above general formula (IV), $R^1$ to $R^5$ are each independently a hydrogen atom, a halogen atom, an alkyl group with 1 to 6 carbon atoms, a trifluoromethyl group, an alkylthio group with 1 to 6 carbon atoms, an alkylseleno group with 1 to 6 carbon atoms, an alkyltelluro group with 1 to 6 carbon atoms, or a nitro group, and $R^6$ and $R^7$ are each independently a hydrogen atom or an alkyl group with 1 to 6 carbon atoms.

A is a linear or branched alkylene group with 1 to 6 carbon atoms, a linear or branched alkenylene group with 2 to 6 carbon atoms, or a polyalkylene oxide group which has 2 to 6 ethylene oxide units or propylene oxide units.

Among those radical polymerizable monomers, a monomer having substituted or unsubstituted phenyl group, a monomer having substituted or unsubstituted naphthyl group, a monomer having substituted or unsubstituted heterocyclic aromatic moiety which has up to 3 rings, a monomer with chlorine atom, and a monomer containing bromine atom are preferable in that they have relatively high refractive index.

The above radical polymerizable monomer may be used either singly or in combination of two or more kinds thereof.

The content of the radical polymerizable monomer in a photosensitive composition is, relative to the total mass of a photosensitive composition, preferably 1 to 25% by mass, and more preferably 5 to 20% by mass.

<Photoradical Polymerization Initiator>

The photoradical polymerization initiator is an agent for initiating photopolymerization of a radical polymerizable monomer according to irradiation of laser beam with specific wavelength or light with excellent coherent property for holographic exposure. As for the photoradical polymerization initiator, known polymerization initiators that are described in the specifications of U.S. Pat. Nos. 4,766,055, 4,868,092, and 4,965,171, JP 54-151024 A, JP 58-15503 A, JP 58-29803 A, JP 59-189340 A, JP 60-76735 A, JP 1-28715 A, JP 4-239505 A, and PROCEEDINGS OF CONFERENCE ON RADIATION CURING ASIA)"(pp. 461 to 477, 1988) or the like can be used, but it is not particularly limited thereto.

Specific examples of the photoradical polymerization initiator include diary' iodonium salts, 2,4,6-substituted-1,3,5-triazines (triazine-based compounds), azo compounds, azide compounds, organic peroxides, organic boronic acid salts, onium salts, halogenated hydrocarbon derivatives, titanocene compounds, monoacyl phosphine oxide, bisacyl phoshpine oxide, and a combination of bisacyl phoshpine oxide and α-hydroxyketone. Furthermore, a photoradical polymerization initiator system based on combined use of a hydrogen donor like thiol compound and bisimidazole derivatives can be also used. The photoradical polymerization initiator may be used either singly or in combination of two or more kinds thereof.

The use amount of the photoradical polymerization initiator is, relative to 100 parts by mass of the radical polymerizable monomer, preferably 0.05 to 50 parts by mass, and more preferably 0.1 to 30 parts by mass.

<Sensitizing Agent>

The photosensitive composition may contain a sensitizing agent which has a sensitizing activity for a photoradical polymerization initiator. The sensitizing agent has a maximum absorption wavelength in the range of 400 to 800 nm, in particular 450 to 700 nm. As the sensitizing agent absorbs light within the above range, the sensitizing activity is exhibited for the photoradical polymerization initiator.

Examples of the sensitizing agent include a cyanine pigment, a polymethyne compound such as styryl pigment, a xanthene compound such as rhodamin B, rhodamin 6G, or pyronin GY, a phenazine compound such as safranin O, a phenoxazine compound such as cresyl violet or brilliant cresyl blue, a phenothiazine compound such as methylene blue or new methylene blue, a diarylmethane compound such as auramine, a triarylmethane compound such as crystal violet, brilliant green, or lissamine green, a (thio)pyrylium compound, a squarilum compound, a coumarine pigment, a thixanthene pigment, an acene pigment, a merocyanine pigment, and a thiazolium pigment. The sensitizing agent may be used either singly or in combination of two or more kinds thereof.

When a sensitizing agent is used, the use amount thereof is preferably 1 to 2000 parts by mass, and more preferably 20 to 1500 parts by mass relative to 100 parts by mass of the photoradical polymerization initiator.

<Matrix Resin or Precursor Thereof>

The matrix resin has an effect of stabilizing a hologram formed by holographic exposure by enhancing the uniformity of film thickness, heat resistance, mechanical and physical properties of a volume hologram recording layer. Furthermore, for forming a volume hologram recording layer, an effect of not inhibiting or exhibiting with high efficiency the diffusive movement phenomenon of a polymerizable monomer or a photopolymer can be provided.

As for the matrix resin, a thermoplastic resin, a thermocurable resin, and an active energy ray curable resin can be used, for example, all without any limitation. Furthermore, those resins modified with polysiloxane chain or perfluoroalkylene chain can be also used. The matrix resin may be used either singly or in combination of two or more kinds thereof.

Examples of the thermoplastic resin include polyvinyl acetate, polyvinyl butyrate, polyvinyl formal, polyvinyl carbazole, polyacrylic acid, polymethacrylic acid, polymethyl acrylate, polymethyl methacrylate, polyethylene acrylate, polybutyl acrylate, polymethacrylonitrile, polyethyl methacrylate, polybutyl methacrylate, polyacrylonitrile, poly-1,2-dichloroethylene, ethylene-vinyl acetate copolymer, syndiotactic polymethyl methacrylate, poly-α-vinylnaphthalate, polycarbonate, cellulose acetate, cellulose triacetate, cellulose acetate butyrate, polystyrene, poly-α-methylstyrene, poly-o-methylstyrene, poly-p-methylstyrene, poly-p-phenylstyrene, poly-2,5-dichlorostyrene, poly-p-chlorostyrene, poly-2,5-dichlorostyrene, polyarylate, polysulfone, polyether sulfone, styrene-acrylonitrile copolymer, styrene-divinylbenzene copolymer, styrene-butadiene copolymer, styrene-maleic acid anhydride copolymer, ABS resin, polyethylene, polyvinyl chloride, polypropylene, polyethylene terephthalate, polybutylene terephthalate, polyethylene naphthalate, polyvinyl pyrrolidone, polyvinylidene chloride, hydrogenated styrene-butadiene-styrene copolymer, polyurethane, polytetrafluoroethylene, polyvinylidene fluoride, a copolymer with tetrafluoroethylene or hexafluoroethylene and vinyl alcohol, vinyl ester, vinyl ether, vinyl acetal, vinyl butyral, or the like, a copolymer between (meth)acrylic acid cyclic aliphatic ester and methyl(meth)acrylate, polyvinyl acetate, and a methyl methacrylate-ethyl acrylate-acrylic acid copolymer.

Examples of the thermocurable resin include unsaturated polyester, an acrylic urethane resin, an epoxy-modified acrylic resin, epoxy-modified unsaturated polyester, polyurethane, an alkyd resin, and a phenol resin.

Examples of the active energy ray curable resin include epoxy acrylate, urethane acrylate, and acryl-modified polyester. In those active energy ray curable resins, other monofunctional or polyfunctional monomer, oligomer, or the like that are described below can be included for the purpose of controlling cross-linking structure and viscosity. For example, mono(meth)acrylate such as tetrahydrofurfuryl (meth)acrylate, hydroxyethyl (meth)acrylate, (meth)acryloyloxyethylsuccinate, or (meth)acryloyloxyethylphthalate and vinyl pyroolidone can be used as a monofunctional compound, and poly(meth)acrylate such as polyol (meth)acrylate (epoxy-modified polyol (meth)acrylate, lactone-modified polyol (meth)acrylate, or the like), polyester(meth)acrylate, epoxy(meth)acrylate, urethane (meth)acrylate, and also poly(meth)acrylate having a skeleton like polybutadiene, isocyanuric acid, hydantoin, melamine, phosphoric acid, imide, or phosphagen can be used as a polyfunctional compound when they are classified based on skeleton structure. Various kinds of a monomer, an oligomer, and a polymer that can be cured by ultraviolet ray or electron beam can be used.

In the case of using the above thermoplastic resin, thermocurable resin, or active energy ray curable resin, a thermal or active energy ray curing agent including metal soap such as cobalt naphthenate or zinc naphthenate, organic peroxides such as benzoyl peroxide or methyl ethyl ketone peroxide, benzophenone, acetophenone, antraquinone, naphtoquinone, azobis isobutyronitrile, diphenyl sulfide or the like can be included in the photosensitive composition.

In the case of using a thermocurable resin or an active energy ray curable resin, curing can be performed by heating or irradiation with active energy ray after forming a photosensitive layer containing a non-cured resin on an adjacent layer. The curing can be performed either before or after the holographic exposure.

Furthermore, a precursor of a matrix resin can be also used. Examples of the precursor include an isocyanate compound and a polyol compound which forms polyurethane in accordance with addition polymerization.

As for the isocyanate compound, a compound having two or more isocyanate groups in one molecule is preferable, but its type is not particularly limited. If the number of an isocyanate group in one molecule is low, there may be a case in which the hardness required for a matrix resin is not obtained. Upper limit of the number of an isocyanate group in one molecule is not particularly limited, but it is generally 8 or less, and particularly preferably 4 or less. As long as it has two or more isocyanate groups in one molecule, its type is not particularly limited. Upper limit of the number of an isocyanate group in one molecule is not particularly limited, but it is generally 20 or less.

Examples of the isocyanate which is used for the present embodiment include an aliphatic isocyanate such as hexamethylene diisocyanate, lysine methyl ester diisocyanate, or 2,4,4-trimethylhexamethylene diisocyanate, alicyclic isocyanate such as isophorone diisocyanate or 4,4'-methylene bis(cyclohexylisocyanate); aromatic isocyanate such as tolylene diisocyanate, 4,4'-diphenylmethane diisocyanate, xylylene diisocyanate, or naphthalene-1,5'-diisocyanate; and a multimer thereof.

Furthermore, other than those described above, a product between water or polyhydric alcohols such as trimethylol ethane or trimethylol propane and the above isocyanate, or hexamethylene diisocyanate multimer, or a derivate thereof can be also mentioned.

The isocyanate compound may be used either singly or in combination of two or more kinds thereof.

Examples of the polyol compound include polypropylene polyol, polycaprolactone polyol, polyester polyol, polycarbonate polyol, ethylene glycol, propylene glycol, 1,4-butane diol, 1,5-pentane diol, 3-methyl-L5-pentane diol, 1,6- hexane diol, neopentyl glycol, diethylene glycol, 1,4-cyclohexane diol, 1,4-cyclohexanedimethanol, decamethylene glycol, trimethylol propane, polyethylene glycol, polypropylene glycol, and polytetramethylene glycol.

The polyol compound may be used either singly or in combination of two or more kinds thereof.

It is possible to blend, in a photosensitive composition, a catalyst for addition polymerization of an isocyanate compound and a polyol compound. By using the catalyst, curing can be achieved at room temperature. However, curing can be also performed by heating. Temperature for the curing is preferably within the range of 40 to 90° C., and the curing time is preferably 1 to 24 hours.

Examples of the catalyst include a typical catalyst for urethanization reaction, for example, a tin compound such as dialuric acid dibutyl tin, dialuric acid dioctyl tin, or dioctanoic acid dibutyl tin, and a tertiary amine compound such as triethylamine or triethylene diamine. Among them, the tin compound has good solubility and good performance as a medium, and dilauric acid dibutyl tin is particularly preferable.

The use amount of the catalyst is, relative to the total amount of an isocyanate compound and a polyol compound, preferably 0.0001% by mass or more, more preferably 0.001% by mass or more, and also preferably 10% by mass or less, and more preferably 5% by mass or less. Incidentally, when the catalyst is used, it is preferably added to the photosensitive composition within 10 minutes before application of the photosensitive composition on an adjacent layer from the viewpoint of ensuring the homogeneity of a coating film of photosensitive layer.

Furthermore, as other precursor of a matrix resin, a cationic polymerizable monomer can be also used. The matrix resin obtained from a cationic polymerizable monomer enables production of a volume hologram recording layer having excellent film strength.

Specific examples of the cationic polymerizable monomer include diglycerol polyglycidyl ether, pentaerythritol polyglycidyl ether, 1,4-bis(2,3-epoxypropoxyperfluoroisopropyl)cyclohexane, sorbitol polyglycidyl ether, trimethylol propanepolyglycidyl ether, resorcin diglycidyl ether, 1,6-hexane diol diglycidyl ether, polyethylene glycol diglycidyl ether, phenylglycidyl ether, p-t-butylphenylglycidyl ether, adipic acid diglycidyl ester, orthophthalic acid diglycidyl ester, dibromophenylglycidyl ether, dibromoneopentyl glycol diglycidyl ether, 1,2,7,8-diepoxyoctane, 1,6-dimethylol perfluorohexane diglycidyl ether, 4,4'-bis(2,3-epoxypropoxyperfluoroisopropyl)diphenyl ether, 3,4-epoxycyclohexylmethyl-3',4'-epoxycyclohexane carboxylate, 3,4-epoxycyclohexyloxilane, 1,2,5,6-diepoxy-4,7-metaperhydroindene, 2-(3,4-epoxycyclohexyl)-3',4'-epoxy-1,3-dioxane-5-spirocyclohexane, 1,2-ethylenedioxy-bis(3,4-epoxycyclohexylmethane), 4',5'-epoxy-2'-methylcyclohexylmethyl-4,5-epoxy-2-methylcyclohexane carboxylate, ethylene glycol-bis(3,4-epoxycyclohexanecarboxylate), bis-(3,4-epoxycyclohexylmethyl)adipate, di-2,3-epoxycyclopentyl ether, vinyl-2-chloroethyl ether, vinyl-n-butyl ether, triethylene glycol divinyl ether, 1,4-cyclohexanedimethanol divinyl ether, trimethylol ethane trivinyl ether, and vinylglycidyl ether. The cationic polymerizable monomer may be used either singly or in combination of two or more kinds thereof.

When the cationic polymerizable monomer is used, it is possible to use a photo cationic polymerization initiator or a thermal cationic polymerization initiator.

Specific examples of the photo cationic polymerization initiator include iodonium salts, triarylsulfonium salts, or the like. Specific examples of the iodonium salts include tetrafluoroborate, hexafluorophosphate, hexafluoroarsenate, hexafluoroantimonate, trifluoromethanesulfonate, 9,10-dimethoxyanthracene-2-sulfonate of iodonium. Specific examples of the triarylsulfonium salts include tetrafluoroborate, hexafluorophosphate, hexafluoroarsenate, hexafluoroantimonate, trifluoromethanesulfonate, or 9,10-dimethoxyanthracene-2-sulfonate of sulfonium such as triarylsulfonium, triphenylsulfonium, 4-t-butyltriphenylsulfonium, tris(4-methylphenyl)sulfonium, tris(4-methoxyphenyl)sulfonium, or 4-thiophenyltriphenylsulfonium. The photo cationic polymerizable monomer may be used either singly or in combination of two or more kinds thereof.

Specific examples of the thermal cationic polymerization initiator include cationic or proton acid catalyst such as triflic acid salt, trifluoroboron ether complex compound, or trifluoroboron, and a preferred thermal cationic polymerization initiator is triflic acid salt. Specifically, there are diethylammonium triflic acid, triethylammonium triflic acid, diisopropylammonium triflic acid, and ethyl diisopropylammonium triflic acid which can be obtained as "FC-520" of 3M Company (most of them are described in Modern Coatings which has been published by R. R. Alm in October, 1980). Furthermore, among the aromatic onium salts which are also used as an active energy ray cationic polymerization initiator, there are salts for generating cationic species by heat, and they also can be used as a thermal cationic polymerization initiator. Examples thereof include San-Aid (registered trademark) SI-60L", "San-Aid (registered trademark) SI-80L" and "San-Aid (registered trademark) SI-100L" (all of them are a product of SANSHIN CHEMICAL INDUSTRY CO., LTD.). When a cationic polymerizable monomer is used as a matrix resin, the use mount of a photo cationic polymerizable monomer or a thermal cationic polymerizable monomer is, relative to 100 parts by mass of a cationic polymerizable monomer, preferably 0.05 to 50 parts by mass, and more preferably 0.1 to 30 parts by mass.

Content of the matrix resin or a precursor resin in the photosensitive composition is, relative to the total mass of the photosensitive composition, preferably 1 to 30% by mass, more preferably 1 to 25% by mass, and even more preferably 5 to 25% by mass.

<Solvent>

For the photosensitive composition, a solvent may be used at the time of coating, if necessary. However, if a component which is in liquid phase at room temperature is contained in the photosensitive composition, there might be a case in which a solvent is not needed.

Examples of the solvent include an aliphatic solvent such as n-pentane, n-hexane, n-heptane, n-octane, cyclohexane, or methylcyclohexane; a ketone solvent such as methyl ethyl ketone (2-butanone), acetone, or cyclohexanone; an ether solvent such as diethyl ether, isopropyl ether, tetrahydrofuran, dioxane, ethylene glycol dimethyl ether, ethylene glycol diethyl ether, diethylene glycol dimethyl ether, diethylene glycol diethyl ether, propylene glycol monomethyl ether, anisole, or phenetole; an ester solvent such as ethyl acetate, butyl acetate, or ethylene glycol diacetate; an aromatic solvent such as toluene or xylene; a cellosolve solvent such as methyl cellosolve, ethyl cellosolve, or butyl cellosolve; an alcohol solvent such as methanol, ethanol, propanol, or isopropyl alcohol; an ether solvent such as tetrahydrofuran or dioxane; a halogen solvent such as dichloromethane or chloroform; a nitrile solvent such as acetonitrile or propionitrile; and a polar solvent such as N-methyl-2-pyrrolidone, N-ethyl-2-pyrrolidone, N,N-dimethyl formamide, or N,N-dimethylacetamide. The solvent may be used either singly or in combination of two or more kinds thereof.

<Additives>

As long as the effect described above is not impaired, additives such as a plasticizer, a compatabilizing agent, a polymerization inhibitor, a surfactant, a silane coupling agent, an anti-foaming agent, a peeling agent, a stabilizer, an anti-oxidation agent, an anti-flame agent, an optical brightening agent, or an UV absorbing agent may be additionally contained in the photosensitive composition, if necessary.

[Method for Producing Photosensitive Composition]

The photosensitive composition can be obtained by mixing each component described above either in batchwise or sequential mode. Examples of a device used for mixing include a stirring or mixing device such as a magnetic stirrer, a homodisperser, a quick homomixer, or a planetary mixer. The obtained photosensitive composition may be used after filtering, if necessary.

[Method for Producing Holographic Optical Element]

As a method for producing a holographic optical element, a production method for forming a volume hologram recording layer by forming a photosensitive layer containing a polymerizable monomer on an adjacent layer containing a resin and performing holographic exposure for the photosensitive layer can be used, although the method is not particularly limited thereto.

Method for producing an adjacent layer is the same as described above, and thus explanations thereof are omitted herein.

The method for forming a photosensitive layer on an adjacent layer is not particularly limited, and there is a method of applying directly the photosensitive composition on an adjacent layer followed by drying, and a method of applying a photosensitive composition on a separately prepared substrate followed by drying and adhering it to an adjacent layer using a laminator or the like followed by peeling of a substrate. In particular, from the viewpoint that the photosensitive composition can easily infiltrate an adjacent layer to easily have a diffraction grating formed so as to extend to the adjacent layer, it is preferable that the photosensitive layer is formed by directly applying the photosensitive composition on an adjacent layer followed by drying.

Furthermore, examples of the substrate include a resin substrate containing an acrylic resin, polycarbonate, polyethylene terephthalate, polybutylene terephthalate, polyethylene naphthoate, polyethylene, polypropylene, amorphous polyolefin, cellulose acetate, hydrated cellulose, nitric acid cellulose, a cycloolefin polymer, polystyrene, polyepoxide, polysulfone, cellulose acylate, polyamide, polyimide, polymethyl methacrylate, polyvinyl chloride, polyvinyl butyral, or polydicyclopentanediene.

As a method for applying the photosensitive composition on an adjacent layer or a substrate, a conventionally known method can be used. Specific examples of the method include a spray method, a spin coating method, a wire bar method, a dip coating method, an air knife coating method, a roll coating method, a blade coating method, and a doctor roll coating method.

As for the drying, conventionally known various kinds of method including hot plate, oven, belt furnace can be employed. Temperature for drying can be selected from a range in which the photosensitizing property of the aforementioned photosensitive composition is not impaired. The temperature is within 10 to 80° C., and the drying time is not particularly limited, and it is within a range of 1 to 60 minutes, for example.

Thickness of the photosensitive layer is suitably set such that it can have preferred thickness range of a volume hologram recording layer which will be described below.

If the holographic optical element of the present embodiment has a structure in which a volume hologram recording layer is sandwiched between two adjacent layers, by forming a photosensitive layer on one adjacent layer and laminating the other adjacent layer on the photosensitive layer using a laminator or the like, a holographic optical element with the corresponding structure can be obtained.

By performing holographic exposure after adhering an adjacent layer to a photosensitive layer according to forming of a photosensitive layer on an adjacent layer, the polymerization reaction of a polymerizable monomer in the photosensitive layer is allowed to progress, and a region of a photopolymer and a region of other components that are generated by the polymerization reaction are formed with the same pattern as interference wave irradiated by holographic exposure. Herein, the holographic exposure may be performed immediately after adhesion or performed after a certain interval. In the case of having a certain interval, the holographic exposure is preferably performed 1 day to 10 days after the adhesion. Accordingly, the photosensitive composition can more easily infiltrate an adjacent layer so that a diffraction grating can be more easily formed so as to extend to an adjacent layer.

[Recording Method]

As a method for performing holographic exposure for a photosensitive layer and recording (describing) a volume hologram to give a volume hologram recording layer, and a method for reproducing (reading) the volume hologram, the following method can be mentioned, for example, although it is not particularly limited thereto.

First, for recording information, light capable of causing an occurrence of chemical change of a polymerizable monomer, that is, a change in polymerization and concentration of a polymerizable monomer, is used as recording light (also referred to as object light).

When information is recorded as a volume hologram, for example, object light is irradiated to a photosensitive layer together with reference light, and the object light is allowed to have an interference with the reference light in the photosensitive layer. Accordingly, the interference light yields a change in polymerization and concentration of a polymerizable monomer in the photosensitive layer. As a result, the interference fringes cause a difference in refractive index in the photosensitive layer and the interference fringes recorded in the photosensitive layer are recorded as a volume hologram, thus yielding a volume hologram recording layer.

As for the recording light used for recording of a volume hologram (wavelength is described in parentheses), visible light laser having an excellent coherent property is preferably used. For example, argon ion laser (458 nm, 488 nm, 514 nm), krypton ion laser (647.1 nm), helium-neon laser (633 nm), YAG layer (532 nm), or the like can be used.

The irradiation energy amount for hologram recording (light exposure amount) is, although not particularly limited, preferably within a range of 10 to 250 mJ/cm$^2$.

Furthermore, as for the hologram recording mode, there is a polarized collinear hologram recording mode, a multiple angle of incidence reference light hologram recording mode, or the like. However, favorable recording quality can be provided by any one of those recording modes.

Figure 4:
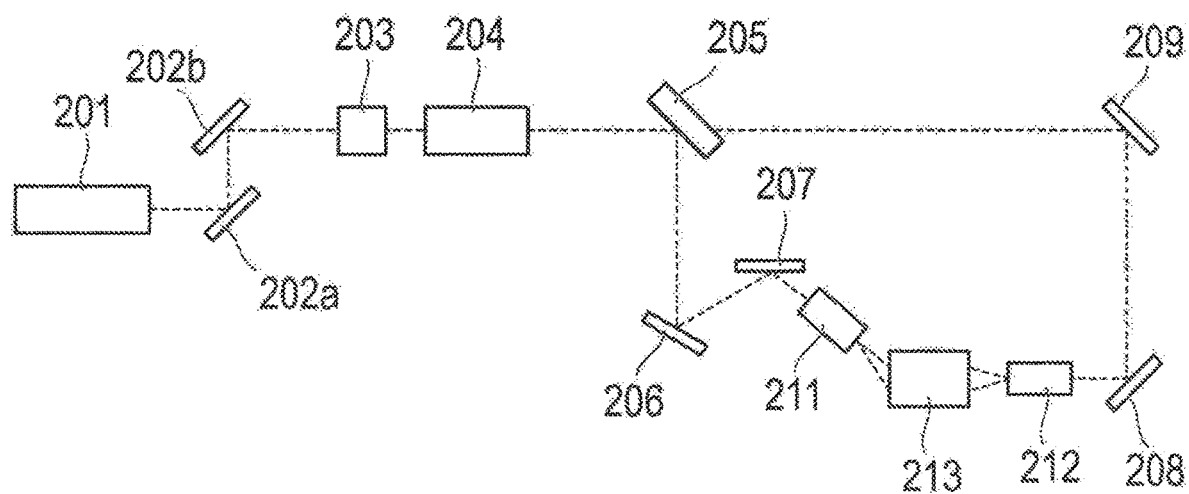
FIG. 4 is a schematic view illustrating an exemplary exposure apparatus used for holographic exposure.

As for the exposure device, an exposure device which has the same schematic structure as shown in FIG. 4 can be used, for example, although it is not particularly limited thereto. According to the exposure device shown in FIG. 4, light emitted from a laser beam source 201 (recording light) is induced, by a beam steerer 202a, 202b consisting of two mirrors, to a suitable position of an exposure device. A shutter 203 controls ON/OFF of light (recording light). A beam expander 204 has a function of modifying the opening rate (N/A) by enlarging the beam diameter in accordance with an exposure area of a photosensitive layer.

Light (recording light) passed through the beam expander 204 is divided to two beams by a beam splitter 205. The divided light (recording light) is induced, by a mirror 206, 207, and a mirror 209, 208, respectively, to a spatial filter 211, 212. The spatial filter 211, 212 consists of a lens and a pin hole, and by collecting the light (recording light) using the lens, it induces the light (recording light) to a production optical system 213 via a pin hole.

According to the production optical system 213, a sample like glass prism provided with a photosensitive layer to become a volume hologram recording layer can be provided and fixed at a suitable position such that the reflection angle of the light of a holographic optical element can be controlled.

The photosensitive layer provided on a prism or the like which is fixed on the production optical system 213 is divided to two beams, and each is subjected to holographic exposure (interference exposure) by the light (recording light) which has been induced by the spatial filter 211, 212, respectively Furthermore, even though there is only one light source shown in FIG. 4, In the case of performing holographic exposure using plural laser light sources having different wavelengths, it is also possible that a chronic mirror is inserted in an optical path before the shutter 203 and laser beam emitted from plural light sources is synthesized in stepwise manner.

For promoting modulation of refractive index or completion of polymerization reaction (fixing) after recording a volume hologram, it is possible to carry out additionally a suitable treatment like light flood exposure using ultraviolet light, heating, or the like for the volume hologram recording layer. As for the light source used for flood exposure, a light source emitting ultraviolet light like an ultra high pressure mercury lamp, a high pressure mercury lamp, a carbon arc lamp, a xenon arc lamp, and a metal halide lamp can be used. In the case of performing flood exposure with ultraviolet light, the irradiation energy amount is preferably 50 to 200 J/cm$^2$. Furthermore, the temperature for carrying out a heating treatment is preferably 50 to 150° C., and time for the treatment is preferably between 30 minutes and 3 hours.

When the flood exposure and heating treatment are carried out together, their order is not particularly limited. The flood exposure can be carried out first, or the heating treatment can be carried out first.

Furthermore, if the matrix resin is a thermoplastic resin, by carrying out the heating at a temperature near the glass transition temperature of a matrix resin, the movement of a polymerizable monomer is promoted so that the modulation amount of refractive index can be increased.

According to the present embodiment, thickness of the volume hologram recording layer is preferably 10 to 100 µm, and more preferably 20 to 50 µm from the viewpoint of durability.

When the volume hologram recorded in a volume hologram recording layer is reproduced, the volume hologram recording layer is irradiated with a certain light for reproduction (usually, reference light). The irradiated light for reproduction yields diffraction in accordance with the interference fringes described above. Since the diffracted light carries the same information as the volume hologram recording layer, by reading the diffracted light using a suitable means for detection, reproduction of the information recorded in the volume hologram recording layer can be carried out. In addition, the wavelength range of object light, light for reproduction, and reference light can be arbitrarily set depending on each use, and it can be either a visible light range or an ultraviolet light range.

[Other Layers]

The holographic optical element of the present embodiment may also have other layers such as a protective layer, reflection layer, reflection preventing layer, or ultraviolet absorbing layer.

The protective layer is a layer for preventing any influence like deteriorated storage stability of a recording layer or the like. Specific configuration of the protective layer is not limited, and known configurations can be applied arbitrarily. For example, a layer composed of a water soluble polymer, an organic/inorganic material, or the like can be formed as a protective layer. Site for forming the protective layer is not particularly limited. The protective layer can be formed on a surface of a volume hologram recording layer or between an adjacent layer and a support, for example. The protective layer can be also formed on an outer surface side of a support.

The reflection layer is formed when the holographic optical element is prepared to be a reflection type. In the case of a holographic optical element of reflection type, the reflection layer is generally formed on an outer surface of an adjacent layer. As for the reflection layer, application can be made with suitable reference to conventional known ones, and a metal foil film or the like can be used, for example.

Furthermore, for a holographic optical element of any one of the transmission type and reflection type, a reflection preventing film can be formed on a side at which object light and reproduction light are entered or emitted, or between a volume hologram recording layer and an adjacent layer. The reflection preventing film works to enhance the utilization efficiency of light and also to suppress an occurrence of a ghost image. As for the reflection preventing film, application can be made with suitable reference to conventional known ones.

[Support]

The holographic optical element of the present embodiment may be additionally sandwiched between transparent supports. The support may be employed to protect and hold the holographic optical element of the present embodiment, and it may be also employed to work, based on complexation with a holographic optical element, as an optical element like prism.

The support is not particularly limited as long as it has required strength and durability, and any support can be used. Furthermore, the shape of a support is not limited, but it is generally formed in a flat plate shape or a film shape. The material of a support is not limited, and it can be either transparent or non-transparent.

Examples of a transparent support material include an inorganic material such as glass, silicon, or quartz. Among them, glass is preferable. Examples of a non-transparent support material include metal like aluminum; and the above transparent supports having metal like gold, silver, and aluminum or a dielectric material like magnesium fluoride and zirconium oxide coated on the support.

A surface treatment may be carried out on a surface of a support. The surface treatment is generally carried out to enhance an adhesion property between a support and a holographic optical element. Examples of the surface treatment include corona discharge treatment carried out for a support and in-advance forming of an undercoating layer on a support. Herein, examples of a composition for an undercoating layer include halogenated phenol, or a partially hydrolyzed vinyl chloride-vinyl acetate-copolymer, and a polyurethane resin.

Furthermore, the surface treatment can be also carried out for the purpose other than enhancement of an adhesion property, and examples thereof include a reflection coating treatment by which a reflection coating layer having a metal like gold, silver, or aluminum as a basic material is formed; and a dielectric material coating treatment by which a dielectric layer of magnesium fluoride or zirconium oxide is formed. Furthermore, those layers may be formed as a single layer or as a double or higher layer.

Furthermore, the above surface treatments can be also carried out for the purpose of controlling the gas or moisture permeability of a holographic optical element. Accordingly, the reliability of a holographic optical element can be further enhanced.

The support can be formed on any one of the upper side and the lower side of a holographic optical element, or it can be formed on both sides of a holographic optical element. However, when the support is provided on both the upper side and the lower side, at least one of the supports is constituted to be transparent such that it can transmit the active energy ray (e.g., recording light, reference light, reproduction light, or the like). When the support is adhered to a holographic optical element, an adhesive having high transparency like silicone adhesive or acryl adhesive can be used.

When the holographic optical element has a support on one side or both sides thereof, a hologram of transmission type or reflection type can be recorded. Furthermore, when a support having reflecting property is used for one side of a holographic optical element, a hologram of reflection type can be recorded.

[Use]

The holographic optical element of the present embodiment is suitably used for a head mount display (HMD), a head up display (HUD), an optical memory, a pick-up lens for optical disc, a color filter for liquid crystal, a liquid crystal reflecting plate of reflection type, a lens, a diffraction grating, an interference filter, a binder for optical fiber, a light polarizer for facsimile, glass window for construction, a cover of a book or a magazine, a display like POP, a gift, a credit card or cash, for security purpose to prevent forgery, a wrapping, or the like.

EXAMPLES

Hereinbelow, explanations are given for specific Examples and Comparative Examples. However, the technical scope of the present invention is not limited to the following Examples. Furthermore, with regard to the following operations, unless specifically described otherwise, operations and measurement of physical properties or the like are carried out at conditions including room temperature (20 to 25° C.)/relative humidity of 40 to 50% RH. Furthermore, the density of an adjacent layer was determined by a measurement based on density gradient column method (JIS K-7112-1999) using a device for measuring specific gravity which is manufactured by Shibayama Scientific Co., Ltd.

<Production of Adjacent Layer 1>

By adding each component shown below to a seal container and continuing stirring for 4 hours after heating to 70° C., cellulose acylate was completely dissolved to obtain dope 1.

(Dope 1)

| Cellulose acylate (substitution degree of acetyl group: 1.78) | 100 parts by mass |
| 2-(2'-Hydroxy-3',5'-di-t-butylphenyl)benzotriazone (ultraviolet absorbing agent) | 1.0 part by mass |
| Plasticizer represented by the following chemical formula (2) | 20 parts by mass |
| Methylene chloride | 475 parts by mass |
| Ethanol | 50 parts by mass |

[Chemical Formula 5]

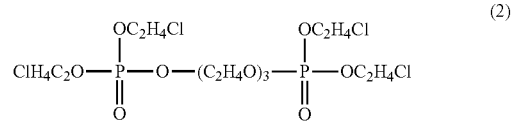

(2)

After filtering the obtained dope 1, by using a belt casting device and setting the temperature of the dope 1 at 35° C., uniform casting was carried out on a stainless band support at 30° C. Thereafter, the dope was dried till to have a peelable residual solvent amount, and the dope 1 was peeled from the stainless band support. The residual solvent amount in the dope 1 was 25% by mass at that time. The time required from the dope casting to peeling was 3 minutes. The dope 1 peeled from the stainless band support was dried at 120° C. while maintaining it in a width direction, and by releasing the maintaining in the width direction, it was transferred by using several rolls and drying was completed in a drying zone at 120° C. and 135° C. to obtain a film. Furthermore, by performing a knurling processing with the width of 10 mm and height of 5 μm for both ends of the film, a cellulose acylate film (adjacent layer 1) having the film thickness of 60 μm was produced. The density of the adjacent layer 1 was 1.19 g/cm$^3$.

<Production of Adjacent Layers 2 to 13>

Adjacent layers 2 to 13 were produced in the same manner as <Production of adjacent layer 1> except that, instead of the cellulose acylate (substitution degree of acetyl group: 1.78), cellulose acylate in which the substitution degree of acetyl group is 1.80, 2.20, 2.38, 2.41, 2.64, 2.67, 2.70, the substitution degree of acetyl group is 2.40, the substitution degree of n-propionyl group is 0.10, the substitution degree of acetyl group is 2.40, the substitution degree of n-propionyl group is 0.40, the substitution degree of acetyl group is 2.40, the substitution degree of n-butanoyl group is 0.20, the substitution degree of acetyl group is 2.40, the substitution degree of benzoyl group is 0.10, the substitution degree of acetyl group is 2.40, and the substitution degree of n-propionyl group is 0.50, respectively, as shown in the following Table 1, is used. The density (g/cm$^3$) of the adjacent layer 2 to 13 was 1.20, 1.21, 1.28, 1.31, 1.35, 1.38, 1.39, 1.32, 1.33, 1.31, 1.31, and 1.34, respectively.

<Production of Adjacent Layer 14>

A methyl polymethacrylate film (PARAPURE, manufactured by Kuraray Co., Ltd., thickness of 100 μm) was directly used as an adjacent layer 14. The density of the film (adjacent layer 14) was 1.24 g/cm$^3$.

<Production of Adjacent Layer 15>

High density polyethylene pellets having the melting point of 98° C. were supplied to an extruder. After melt extrusion at the temperature of 280° C., filtering was carried out by using a 30 µm cut-off filter. Thereafter, they were introduced to an opening of a T die.

Subsequently, from the inside of the opening of a T die, extrusion into a sheet shape was carried out to yield a melt monolayer sheet. The resulting melt monolayer sheet was subjected to, by an electrostatic application method, tight adhesion and cooling solidification on a drum of which the surface temperature has been maintained at 20° C. Accordingly, a polyethylene film with the film thickness of 60 µm (adjacent layer 15) was obtained. The thickness of the obtained film (adjacent film 15) was 0.96 g/cm$^3$.

<Production of Adjacent Layer 16>

Polyethylene terephthalate (PET) pellets having the glass transition temperature of 80° C. and the melting point of 253° C. were supplied to an extruder. After melt extrusion at the temperature of 280° C., filtering was carried out by using a 30 µm cut-off filter. Thereafter, they were introduced to an opening of a T die.

Subsequently, from the inside of the opening of a T die, extrusion into a sheet shape was carried out to yield a melt monolayer sheet. The resulting melt monolayer sheet was subjected to, by an electrostatic application method, tight adhesion and cooling solidification on a drum of which the surface temperature has been maintained at 20° C. Accordingly, a non-aligned (non-stretched) monolayer film was obtained. Subsequently, the obtained non-aligned monolayer film was pre-heated with a group of rolls heated to the temperature of 90° C. After that, by using a heating roll at the temperature of 95° C., inter-roll stretching of 2.5 times in the length direction (longitudinal direction) was carried out, and by cooling using a group of rolls at the temperature of 25° C., a uniaxially aligned (uniaxially stretched) film was obtained.

While clamping both ends of the obtained uniaxially aligned (uniaxially stretched) film with a clip, the film was introduced to a pre-heating zone at the temperature of 95° C. inside a tenter. Subsequently, according to elongation of 2.5 times in a direction perpendicular to the length direction (width direction) in a heating zone at the temperature of 105° C., stretching was carried out. Furthermore, in the heat treatment zone in a tenter, a heat treatment at 230° C. was carried out for 20 seconds. Furthermore, after carrying out a relaxation treatment in 4% width direction at the temperature of 200° C., a relaxation treatment in 1% width direction at the temperature of 140° C. was additionally carried out. Subsequently, according to winding following even and gradual cooling, a PET film with film thickness of 60 µm (adjacent layer 16) was obtained. Thickness of the obtained film (adjacent film 16) was 1.40 g/cm$^3$.

Constitution and density of the adjacent layers 1 to 16 are shown in the following Table 1.

TABLE 1

| Adjacent layer No. | Resin | Substitution degree of cellulose acylate | | | | Density (g/cm$^3$) |
| | | Acetyl group | n-propionyl group | n-butanoyl group | Benzoyl group | |
|---|---|---|---|---|---|---|
| 1 | Cellulose acylate | 1.78 | — | — | — | 1.19 |
| 2 | | 1.80 | — | — | — | 1.20 |
| 3 | | 2.20 | — | — | — | 1.21 |
| 4 | | 2.38 | — | — | — | 1.28 |
| 5 | | 2.41 | — | — | — | 1.31 |
| 6 | | 2.64 | — | — | — | 1.35 |
| 7 | | 2.67 | — | — | — | 1.38 |
| 8 | | 2.70 | — | — | — | 1.39 |
| 9 | | 2.40 | 0.10 | — | — | 1.32 |
| 10 | | 2.40 | 0.40 | — | — | 1.33 |
| 11 | | 2.40 | — | 0.20 | — | 1.31 |
| 12 | | 2.40 | — | — | 0.10 | 1.31 |
| 13 | | 2.40 | — | — | 0.50 | 1.34 |
| 14 | Methyl polymethacrylate | — | — | — | — | 1.24 |
| 15 | Polyethylene | — | — | — | — | 0.96 |
| 16 | Polyethylene terephthalate | — | — | — | — | 1.40 |

Example 1: Production of Holographic Optical Element 1

According to addition of the following components to a vessel in a dark room and stirring for 30 minutes at room temperature, a solution was obtained. The obtained solution was filtered using a mesh, and it was used as a photosensitive composition 1 for producing a volume hologram recording layer.

<Photosensitive Composition 1 for Producing a Volume Hologram Recording Layer>

| | |
|---|---|
| Vinyl acetate-tetrafluoroethylene copolymer {vinyl acetate:tetrafluoroethylene = 78:22 (mass ratio)} | 12.0 parts by mass |
| Phenol ethoxylate monoacrylate | 1.0 part by mass |
| Ethoxylated bisphenol A diacrylate | 2.0 parts by mass |
| Fluorine-based nonionic surfactant (FC-430; Fluorad 430; product of 3M Company) | 0.10 part by mass |
| 2,2'-Bis(2-chlorophenyl)-4,4',5,5'-tetraphenyl-1,1'-bisimidazole | 0.05 part by mass |
| 4-Methyl-4H-1,2,4-triazole-3-thiol | 0.05 part by mass |
| Squarium compound with following structure | 0.10 part by mass |

[Chemical Formula 6]

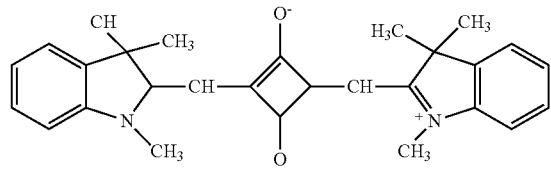

| | |
|---|---|
| 2-Butanone | 30.0 parts by mass |

On a polyethylene terephthalate (PET) film with thickness of 100 μm, the photosensitive composition 1 for producing a volume hologram recording layer was applied by using a blade coater. According to drying for 30 minutes in an environment of 20° C., 50% RH, a photosensitive layer with thickness of 25 μm was obtained. After that, an adjacent layer 2 which has been separately produced was laminated on the photosensitive layer by using a laminator.

Subsequently, the PET film was peeled off, and by further laminating the adjacent layer 2 on the exposed photosensitive layer using a laminator, the photosensitive film 1 that is formed by having the photosensitive layer, which has been formed with the photosensitive composition 1 for producing a volume hologram recording layer, sandwiched between two pieces of the adjacent layer 2 was obtained.

Figure 3:
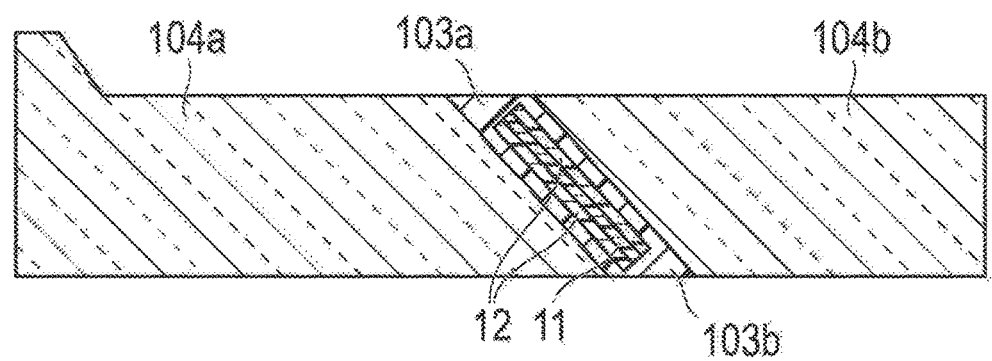
FIG. 3 is a schematic cross-sectional view illustrating an exemplary sample for which holographic exposure is carried out.

The obtained photosensitive film 1 was sandwiched with a pair of glass prism base 104a, 104b which have been applied with silicone adhesive 103a, 103b as shown in FIG. 3, and by using an exposure device provided with the same basic structure as FIG. 4 (light source; argon laser, exposure wavelength: 514 nm), holographic exposure was carried out such that the irradiation energy amount on the photosensitive layer side is 24 mJ/cm².

After carrying out the holographic exposure, the film was placed for 60 minutes at a site which is 15 cm apart from a high pressure mercury lamp (illuminance of 100 W) followed by heating treatment for 3 hours at 100° C., and thus a holographic optical element 1 having a volume hologram recording layer was obtained.

Examples 2 to 12 and Comparative Examples 1 to 4: Production of Holographic Optical Elements 2 to 16

Holographic optical elements 2 to 12 were produced in the same manner as Example 1 except that the adjacent layer 2 is modified to adjacent layers 2 to 7, 9 to 14 as shown in the following Table 2, and they were taken as Examples 2 to 12. Furthermore, holographic optical elements 13 to 16 were produced in the same manner as Example 1 except that the adjacent layer 2 is modified to adjacent layers 1, 8, 15, or 16 as shown in the following Table 2, and they were taken as Comparative Examples 1 to 4.

Comparative Example 5: Production of Holographic Optical Element 17

On a single surface of the adjacent layer 1, the photosensitive composition 1 for producing a volume hologram recording layer was applied by using a blade coater. According to drying for 30 minutes in an environment of 20° C., 50% RH, a photosensitive layer with thickness of 25 μm was obtained. After that, an adjacent layer 1 which has been separately produced was additionally laminated by using a laminator on a surface of the photosensitive layer in which the adjacent layer 1 is not formed. Accordingly, a photosensitive film 17 that is formed by having the photosensitive layer, which has been formed with the photosensitive composition 1 for producing a volume hologram recording layer, sandwiched between two pieces of the adjacent layer 1 was obtained.

The obtained photosensitive film 17 was sandwiched with a pair of glass prism base 104a, 104b which have been applied with silicone adhesive 103a, 103b as shown in FIG. 3, and by using an exposure device provided with the same basic structure as FIG. 4 (light source; argon laser, exposure wavelength: 514 nm), holographic exposure was carried out such that the irradiation energy amount on the photosensitive layer side is 24 mJ/cm².

After carrying out the holographic exposure, the film was placed for 60 minutes at a site which is 15 cm apart from a high pressure mercury lamp (illuminance of 100 W) followed by heating treatment for 24 hours at 100° C., and thus the holographic optical element 17 having a volume hologram recording layer was obtained.

Examples 13 to 15 and Comparative Example 6: Production of Holographic Optical Elements 18 to 21

Holographic optical elements 18 to 21 were produced in the same manner as Comparative Example 5 except that the adjacent layer 1 is modified to adjacent layers 2, 5, 12, and 16, respectively, as shown in the following Table 2, and they were taken as Examples 13 to 15 and Comparative Example 6.

Comparative Example 7: Production of Holographic Optical Element 22

On a single surface of the adjacent layer 1, the photosensitive composition 1 for producing a volume hologram recording layer was applied by using a blade coater. According to drying for 30 minutes in an environment of 20° C., 50% RH, a photosensitive layer with thickness of 25 μm was obtained. After that, an adjacent layer 1 which has been separately produced was additionally laminated by using a laminator on a surface of the photosensitive layer in which the adjacent layer 1 is not formed. Accordingly, a photosensitive film 22 that is formed by having the photosensitive layer, which has been formed with the photosensitive composition 1 for producing a volume hologram recording layer, sandwiched between two pieces of the adjacent layer 1 was obtained.

The obtained photosensitive film 22 was allowed to stand for 5 days in an environment of 20° C., 50% RH. The photosensitive film 22 after standing was sandwiched with a pair of glass prism base 104a, 104b which have been applied with a silicone adhesive 103a, 103b as shown in FIG. 3, and by using an exposure device provided with the same basic structure as FIG. 4 (light source; argon laser, exposure wavelength: 514 nm), holographic exposure was carried out such that the irradiation energy amount on the photosensitive layer side is 24 mJ/cm².

After carrying out the holographic exposure, the film was placed for 60 minutes at a site which is 15 cm apart from a high pressure mercury lamp (illuminance of 100 W) followed by heating treatment for 3 hours at 100° C., and thus the holographic optical element 22 having a volume hologram recording layer was obtained.

Example 16: Production of Holographic Optical Element 23

On a polyethylene terephthalate (PET) film with thickness of 100 μm, the photosensitive composition 1 for producing a volume hologram recording layer was applied by using a blade coater. According to drying for 30 minutes in an environment of 20° C., 50% RH, a photosensitive layer with thickness of 25 μm was obtained. After that, an adjacent layer 2 was laminated on the photosensitive layer by using a laminator.

Subsequently, the PET film was peeled off, and by further laminating a separately produced adjacent layer 2 on the exposed photosensitive layer using a laminator, a photosensitive film 23 that is formed by having the photosensitive layer, which has been formed with the photosensitive composition 1 for producing a volume hologram recording layer, sandwiched between two pieces of the adjacent layer 2 was obtained.

The obtained photosensitive film 23 was allowed to stand for 5 days in an environment of 20° C., 50% RH. The photosensitive film 23 after standing was sandwiched with a pair of glass prism base 104a, 104b which have been applied with a silicone adhesive 103a, 103b as shown in FIG. 3, and by using an exposure device provided with the same basic structure as FIG. 4 (light source; argon laser, exposure wavelength: 514 nm), holographic exposure was carried out such that the irradiation energy amount on the photosensitive layer side is 24 mJ/cm².

After carrying out the holographic exposure, the film was placed for 60 minutes at a site which is 15 cm apart from a high pressure mercury lamp (illuminance of 100 W) followed by heating treatment for 3 hours at 100° C., and thus the holographic optical element 23 having a volume hologram recording layer was obtained.

Examples 17 and 18: Production of Holographic Optical Elements 24 and 25

Holographic optical elements 24 and 25 were obtained in the same manner as Example 16 except that the adjacent layer 2 is modified to adjacent layers 8 and 12, respectively, as shown in the following Table 3.

Comparative Example 8: Production of Holographic Optical Element 26

A holographic optical element 26 was obtained in the same manner as Comparative Example 7 except that the adjacent layer 2 is modified to adjacent layer 16 as shown in the following Table 3.

Comparative Example 9: Production of Holographic Optical Element 27

According to addition of the following components to a vessel in a dark room and stirring for 30 minutes at room temperature, a solution was obtained. The obtained solution was filtered using a mesh to obtain a mixture 2.

| | |
|---|---|
| Hexamethylene diisocyanate | 0.10 part by mass |
| Polypropylene glycol (molecular weight of 4000, hydroxyl number of 25.3 mgKOH/g) | 10.0 parts by mass |
| 2-{{[3-(Methylsulfanyl)phenyl]carbamoyl}oxy} ethylprop-2-enoate | 3.0 parts by mass |
| CGI 909 (organic boronic acid salt polymerization initiator, product of BASF Japan) | 0.01 part by mass |
| New methylene blue (phenothiazine-based sensitizing pigment, product of BASF Japan) | 0.10 part by mass |
| N-Ethylpyrrolidone | 0.50 part by mass |
| Ethyl acetate | 25.0 parts by mass |

Five minutes after obtaining a photosensitive composition 2 for producing a volume hologram recording layer by adding 0.01 part by mass of dilauric acid dibutyl tin to the obtained mixture 2, on a single surface of the adjacent layer 1, the photosensitive composition 2 for producing a volume hologram recording layer was applied by using a blade coater. After that, drying was carried out for 30 minutes in an environment of 20° C., 50% RH followed by an additional heat treatment at 60° C. for 2 hours, and thus a photosensitive layer with thickness of 25 μm was obtained. After that, an adjacent layer 1 which has been separately produced was additionally laminated by using a laminator on a surface of the photosensitive layer in which the adjacent layer 1 is not formed. Accordingly, a photosensitive film 27 that is formed by having the photosensitive layer, which has been formed with the photosensitive composition 2 for producing a volume hologram recording layer, sandwiched between two pieces of the adjacent layer 1 was obtained.

The obtained photosensitive film 27 was allowed to stand for 5 days in an environment of 20° C., 50% RH. The photosensitive film 27 after standing was sandwiched with a pair of glass prism base 104a, 104b which have been applied with a silicone adhesive 103a, 103b as shown in FIG. 3, and by using an exposure device provided with the same basic structure as FIG. 4 (light source; argon laser, exposure wavelength: 514 nm), holographic exposure was carried out such that the irradiation energy amount on the photosensitive layer side is 24 mJ/cm². Accordingly, the holographic optical element 27 having a volume hologram recording layer was obtained.

Example 19: Production of Holographic Optical Element 28

On a polyethylene terephthalate (PET) film with thickness of 100 μm, the photosensitive composition 2 for producing a volume hologram recording layer was applied by using a blade coater. According to drying for 30 minutes in an environment of 20° C., 50% RH, a photosensitive layer with thickness of 25 μm was obtained. After that, an adjacent layer 2 was laminated on the photosensitive layer by using a laminator.

Subsequently, the PET film was peeled off, and by further laminating a separately produced adjacent layer 2 on the exposed photosensitive layer using a laminator, a photosensitive film 28 that is formed by having the photosensitive layer, which has been formed with the photosensitive composition 2 for producing a volume hologram recording layer, sandwiched between two pieces of the adjacent layer 2 was obtained.

The obtained photosensitive film 28 was sandwiched with a pair of glass prism base 104a, 104b which have been applied with a silicone adhesive 103a, 103b as shown in FIG. 3, and by using an exposure device provided with the same basic structure as FIG. 4 (light source; argon laser, exposure wavelength: 514 nm), the holographic exposure was carried out such that the irradiation energy amount on the photosensitive layer side is 24 mJ/cm$^2$. Accordingly, a holographic optical element 28 having a volume hologram recording layer was obtained.

Example 20: Production of Holographic Optical Element 29

A holographic optical element 29 was produced in the same manner as Example 19 except that the obtained photosensitive film is allowed to stand for 5 days in an environment of 20° C., 50% RH, and then subjected to holographic exposure after being sandwiched by using a pair of glass prism bases which have been applied with a silicone adhesive.

Example 21: Production of Holographic Optical Element 30

A holographic optical element 30 was produced in the same manner as Comparative Example 9 except that the adjacent layer 1 is changed to the adjacent layer 2 and, immediately after obtaining further a photosensitive film, sandwiching using a pair of glass prism bases which have been applied with a silicone adhesive and holographic exposure are carried out.

Examples 22 and 23: Production of Holographic Optical Elements 31 and 32

Holographic optical elements 31 and 32 were obtained in the same manner as Example 19 except that the adjacent layer 2 is changed to the adjacent layer 8 and adjacent layer 12, respectively, as shown in Table 3 below.

Comparative Example 10: Production of Holographic Optical Element 33

A holographic optical element 33 was obtained in the same manner as Comparative Example 9 except that the adjacent layer 1 is changed to the adjacent layer 16.

Comparative Example 11: Production of Holographic Optical Element 34

According to addition of the following components to a vessel in a dark room and stirring for 30 minutes at room temperature, a solution was obtained. The obtained solution was filtered using a mesh to give a photosensitive composition 3 for producing a volume hologram recording layer.
<Photosensitive Composition 3 for Producing a Volume Hologram Recording Layer>

| | |
|---|---|
| Acrylic resin solution (PHORET (registered trademark) GS-1000, solid content of 30% by mass, product of Soken Chemical & Engineering Co., Ltd.) | 30 parts by mass |
| DENACOL EX-411 (pentaerythritol polyglycidyl ether, product of Nagase ChemteX Corporation) | 5.0 parts by mass |
| 9,9-Bis(4-acryloxydiethoxyphenyl)fluorene | 4.0 parts by mass |
| Radical polymerization initiator (diphenyliodonium·trifluoromethanesulfonate) | 0.01 part by mass |
| Cationic polymerization initiator (triarylsulfonium·hexafluoroantimonate, product of BASF Japan) | 0.02 part by mass |
| New methylene blue (phenothiazine-based sensitizing pigment, product of BASF Japan) | 0.10 part by mass |
| Ethyl acetate | 5.0 parts by mass |

On a single surface of the adjacent layer 1, the photosensitive composition 3 for producing a volume hologram recording layer was applied by using a blade coater. According to drying for 30 minutes in an environment of 20° C., 50% RH, a photosensitive layer was obtained. After that, an adjacent layer 1 which has been separately produced was additionally laminated by using a laminator on a surface of the photosensitive layer in which the adjacent layer 4 is not formed. Accordingly, a photosensitive film 34 that is formed by having the photosensitive layer, which has been formed with the photosensitive composition 3 for producing a volume hologram recording layer, sandwiched between two pieces of the adjacent layer 1 was obtained.

The obtained photosensitive film 34 was allowed to stand for 5 days in an environment of 20° C., 50% RH. The photosensitive film 34 after standing was sandwiched with a pair of glass prism base 104a, 104b which have been applied with a silicone adhesive 103a, 103b as shown in FIG. 3, and by using an exposure device provided with the same basic structure as FIG. 4 (light source; argon laser, exposure wavelength: 514 nm), holographic exposure was carried out such that the irradiation energy amount on the photosensitive layer side is 24 mJ/cm$^2$.

After carrying out the holographic exposure, the film was additionally placed for 30 minutes at a site which is 20 cm apart from a xenon arc lamp (illuminance of 150 W), and thus the holographic optical element 34 having a volume hologram recording layer was obtained.

Examples 24, 26, and 27: Production of Holographic Optical Elements 35, 37, and 38

Holographic optical elements 35, 37, and 38 were produced in the same manner as Comparative Example 11 except that the adjacent layer 1 is changed to the adjacent layers 2, 8, and 12, respectively, as shown in the following Table 3, and immediately after obtaining a photosensitive film, sandwiching further using a pair of glass prism bases and holographic exposure were carried out.

Example 25 and Comparative Example 12: Production of Holographic Optical Elements 36 and 39

Holographic optical elements 36 and 39 were produced in the same manner as Comparative Example 11 except that the adjacent layer 1 is changed to the adjacent layers 2 and 16, respectively, as shown in Table 3 below.

(Evaluation)
<Measurement of Diffraction Grating on Adjacent Layer Side>

According to the method of above Examples and Comparative Examples, a bilayer structure sample for evaluation having one layer of a volume hologram recording layer with size of 10 mm×20 mm and one layer of an adjacent layer with size of 11 mm×21 mm was prepared. Furthermore, a sample for evaluation as a holographic optical element (Nos. 1 to 16, 23 to 25, 28 to 29, 31 and 32), in which a photosensitive layer is formed on an adjacent layer only by lamination, was produced by performing an adhesion between a photosensitive layer and an adjacent layer by lamination. A sample for evaluation as a holographic optical element (Nos. 17 to 22, 26 to 27, 30, and 33 to 39), in which a photosensitive composition is directly coated on an adjacent layer followed by drying to yield a photosensitive layer was prepared by direct coating of a photosensitive composition on an adjacent layer followed by drying.

After freeze-drying the produced sample for evaluation with liquid nitrogen, it was cut with a microtome to prepare a sample capable of observing an end part of an adjacent layer, and near interface region between a volume hologram recording layer and an adjacent layer.

Each sample was observed under the transmission electron microscope JEM-2100 (product of JEOL Ltd.) at magnification of 100,000 with acceleration voltage of 50 kV.

In an observed surface of each sample, by drawing an extended line from an end part of an adjacent layer to an interface between a volume hologram recording layer and an adjacent layer, the interface between a volume hologram recording layer and an adjacent layer was clarified. Subsequently, 100 gratings of a diffraction grating present in the observed surface were randomly selected, and to determine how close the grating is formed on the adjacent layer side relative to the interface between a volume hologram recording layer and an adjacent layer, its length was measured and the average value thereof was calculated.

<Diffraction Efficiency>

Transmittance of the obtained holographic optical elements 1 to 39 was measured at the following conditions by using the spectrophotometer U-3900 (product of Hitachi, Ltd.).

Scanning range: 800 nm to 400 nm
Scanning speed: 600 nm/min

The base line was calculated from the transmittance in the wavelength of from 600 nm to 460 nm of the obtained transmittance data, and from the values of the transmittance T at the wavelength of 514 nm and the transmittance B of the base line, diffraction efficiency was calculated on the basis of the following equation.

Diffraction efficiency (%)=[$(B-T)/T$]×100

From the calculated diffraction efficiency, rank classification was made based on the following criteria. ⊙ and ○ indicate a practically acceptable level. When the diffraction efficiency is 75% or higher, if an LED light source is used as a light source of reproduction light, there is a possibility of reducing the power consumption by an LED light source. On the other hand, when the diffraction efficiency is low like lower than 61%, it is necessary to increase the light emission intensity of an LED light, and thus a problem like increased power consumption may easily occur.

<<Criteria for Evaluating Diffraction Efficiency>>
⊙: Diffraction efficiency is 75% or higher
○: Diffraction efficiency is 61% or higher but lower than 75%
×: Diffraction efficiency is lower than 61%

<Ghost>

With regard to the obtained holographic optical elements 1 to 39, image information was projected to the glass prism base by using an LED light source which has a light emitting region in the wavelength of from 540 nm to 510 nm, and a ghost occurrence profile on the image observed by a naked eye was evaluated as described below. ⊙ and ○ indicate a practically acceptable level.

<<Criteria for Evaluating Ghost>>
⊙: Ghost does not occur at all
○: Ghost occurs slightly, but image information can be sufficiently recognized
×: Ghost is strong so that image information cannot be recognized Constitutions and evaluation results of the holographic optical elements 1 to 39 are shown in the following Table 2 and Table 3.

TABLE 2

| | Holographic optical element No. | Photosensitive composition No. | Adjacent layer No. | Density of adjacent layer (g/cm³) | Adhesion between photosensitive layer and adjacent layer | Time between adhesion of photosensitive layer and exposure | Diffraction grating length on adjacent layer side (mm) | Diffraction efficiency Measured value (%) | Rank | Ghost |
|---|---|---|---|---|---|---|---|---|---|---|
| Example 1 | 1 | 1 | 2 | 1.20 | Only lamination | Immediately | 11 | 65 | ○ | ○ |
| Example 2 | 2 | 1 | 3 | 1.21 | Only lamination | Immediately | 13 | 67 | ○ | ○ |
| Example 3 | 3 | 1 | 4 | 1.28 | Only lamination | Immediately | 16 | 68 | ○ | ○ |
| Example 4 | 4 | 1 | 5 | 1.31 | Only lamination | Immediately | 22 | 73 | ○ | ⊙ |
| Example 5 | 5 | 1 | 6 | 1.35 | Only lamination | Immediately | 21 | 72 | ○ | ⊙ |
| Example 6 | 6 | 1 | 7 | 1.38 | Only lamination | Immediately | 18 | 69 | ○ | ○ |
| Example 7 | 7 | 1 | 9 | 1.32 | Only lamination | Immediately | 21 | 71 | ○ | ⊙ |
| Example 8 | 8 | 1 | 10 | 1.33 | Only lamination | Immediately | 20 | 70 | ○ | ⊙ |
| Example 9 | 9 | 1 | 11 | 1.31 | Only lamination | Immediately | 20 | 71 | ○ | ⊙ |
| Example 10 | 10 | 1 | 12 | 1.31 | Only lamination | Immediately | 24 | 74 | ○ | ⊙ |
| Example 11 | 11 | 1 | 13 | 1.31 | Only lamination | Immediately | 25 | 75 | ⊙ | ⊙ |
| Example 12 | 12 | 1 | 14 | 1.24 | Only lamination | Immediately | 13 | 66 | ○ | ○ |
| Comparative Example 1 | 13 | 1 | 1 | 1.19 | Only lamination | Immediately | 0 | 59 | X | X |
| Comparative Example 2 | 14 | 1 | 8 | 1.31 | Only lamination | Immediately | 0 | 60 | X | X |
| Comparative Example 3 | 15 | 1 | 15 | 0.96 | Only lamination | Immediately | 0 | 58 | X | X |
| Comparative Example 4 | 16 | 1 | 16 | 1.40 | Only lamination | Immediately | 0 | 60 | X | X |
| Comparative Example 5 | 17 | 1 | 1 | 1.19 | Coating and lamination | Immediately | 0 | 58 | X | X |
| Example 13 | 18 | 1 | 2 | 1.20 | Coating and lamination | Immediately | 13 | 67 | ○ | ○ |
| Example 14 | 19 | 1 | 5 | 1.31 | Coating and lamination | Immediately | 24 | 73 | ○ | ⊙ |
| Example 15 | 20 | 1 | 12 | 1.31 | Coating and lamination | Immediately | 28 | 75 | ⊙ | ⊙ |

TABLE 2-continued

| | Holographic optical element No. | Photosensitive composition No. | Adjacent layer No. | Density of adjacent layer (g/cm³) | Adhesion between photosensitive layer and adjacent layer | Time between adhesion of photosensitive layer and exposure | Diffraction grating length on adjacent layer side (mm) | Diffraction efficiency Measured value (%) | Rank | Ghost |
|---|---|---|---|---|---|---|---|---|---|---|
| Comparative Example 6 | 21 | 1 | 16 | 1.40 | Coating and lamination | Immediately | 0 | 58 | X | X |

TABLE 3

| | Holographic optical element No. | Photosensitive composition No. | Adjacent layer No. | Density of adjacent layer | Adhesion between photosensitive layer and adjacent layer | Time between adhesion of photosensitive layer and exposure | Diffraction grating length on adjacent layer side (mm) | Diffraction efficiency Measured value (%) | Rank | Ghost |
|---|---|---|---|---|---|---|---|---|---|---|
| Comparative Example 7 | 22 | 1 | 1 | 1.19 | Coating and lamination | 5 Days | 0 | 57 | X | X |
| Example 16 | 23 | 1 | 2 | 1.20 | Only lamination | 5 Days | 13 | 64 | ○ | ○ |
| Example 17 | 24 | 1 | 8 | 1.31 | Only lamination | 5 Days | 24 | 73 | ○ | ⊙ |
| Example 18 | 25 | 1 | 12 | 1.31 | Only lamination | 5 Days | 28 | 76 | ⊙ | ⊙ |
| Comparative Example 8 | 26 | 1 | 16 | 1.40 | Coating and lamination | 5 Days | 0 | 60 | X | X |
| Comparative Example 9 | 27 | 2 | 1 | 1.19 | Coating and lamination | 5 Days | 0 | 58 | X | X |
| Example 19 | 28 | 2 | 2 | 1.20 | Only lamination | Immediately | 11 | 65 | ○ | ○ |
| Example 20 | 29 | 2 | 2 | 1.20 | Only lamination | 5 Days | 14 | 67 | ○ | ○ |
| Example 21 | 30 | 2 | 2 | 1.20 | Coating and lamination | Immediately | 15 | 67 | ○ | ○ |
| Example 22 | 31 | 2 | 8 | 1.31 | Only lamination | Immediately | 23 | 73 | ○ | ⊙ |
| Example 23 | 32 | 2 | 12 | 1.31 | Only lamination | Immediately | 26 | 76 | ⊙ | ⊙ |
| Comparative Example 10 | 33 | 2 | 16 | 1.40 | Coating and lamination | 5 Days | 0 | 59 | X | X |
| Comparative Example 11 | 34 | 3 | 1 | 1.19 | Coating and lamination | 5 Days | 0 | 57 | X | X |
| Example 24 | 35 | 3 | 2 | 1.20 | Coating and lamination | Immediately | 11 | 63 | ○ | ○ |
| Example 25 | 36 | 3 | 2 | 1.20 | Coating and lamination | 5 Days | 14 | 64 | ○ | ○ |
| Example 26 | 37 | 3 | 8 | 1.31 | Coating and lamination | Immediately | 23 | 70 | ○ | ⊙ |
| Example 27 | 38 | 3 | 12 | 1.31 | Coating and lamination | Immediately | 26 | 72 | ○ | ⊙ |
| Comparative Example 12 | 39 | 3 | 16 | 1.40 | Coating and lamination | 5 Days | 0 | 58 | X | X |

As it is evident from the above Table 2 and Table 3, the holographic optical element of Examples has a diffraction grating which is formed so as to extend to an adjacent layer, and as it has excellent diffraction efficiency, an occurrence of a ghost can be suppressed.

From the results of Examples 1 to 12 and Comparative Examples 1 to 4, it was able to confirm that, when the density of an adjacent layer is 1.20 to 1.38, or preferably 1.30 to 1.35, the diffraction grating is formed such that it extends even further to the inside of an adjacent layer, and as the diffraction efficiency is further enhanced, it is more unlikely to have an occurrence of a ghost. In this regard, it is believed that, when the density of an adjacent layer is within the above range, the photosensitive composition for producing a volume hologram recording layer can suitably infiltrate and easily yield interface turbidity, and when holographic exposure is carried out in that state, a diffraction grating can be formed such that it extends even further to the inside of an adjacent layer, so that diffraction efficiency is enhanced to suppress an occurrence of a ghost.

In Examples 10 and 11, in particular, the benzoyl group contained in cellulose acylate in the adjacent layer works to increase the affinity to a radical polymerizable monomer to yield more improved forming of a diffraction grating in an adjacent layer. As a result, the diffraction efficiency is further enhanced, yielding a phenomenon of a suppressed occurrence of a ghost.

From the results of Examples 13 to 15, it is believed that, when a photosensitive composition for producing a volume hologram recording layer is directly coated on an adjacent layer, the photosensitive composition for producing a volume hologram recording layer can more easily infiltrate the adjacent layer at the time of coating so that it becomes more easier to have an unclear interface of an adjacent layer. It is believed that, when holographic exposure is carried out in that state, a diffraction grating can be formed such that it extends even further to the inside of an adjacent layer, so that diffraction efficiency is enhanced to suppress an occurrence of a ghost.

From the results of Examples 16 to 18, it is believed that, when an interval between contact of an adjacent layer with a photosensitive composition for producing a volume hologram recording layer and holographic exposure is extended, the photosensitive composition for producing a volume hologram recording layer can more easily infiltrate the adjacent layer so that it becomes more easier to have an unclear interface of an adjacent layer. It is believed that, when holographic exposure is carried out in that state, a diffraction grating can be formed such that it extends even further to the inside of an adjacent layer, so that diffraction efficiency is enhanced to suppress an occurrence of a ghost.

From the results of Examples 1 to 18, Examples 19 to 23, and Examples 24 to 27, it can be confirmed that the effect of enhancing diffraction efficiency and suppressing a ghost can be obtained regardless of the composition of a photosensitive composition containing a radical polymerizable monomer.

Furthermore, this application claims the benefit of Japanese Patent Application No. 2015-146066, filed on Jul. 23, 2015, and the disclosure of which is hereby incorporated by reference herein in its entirety.

The invention claimed is:

1. A holographic optical element comprising:
a volume hologram recording layer comprising a photosensitive layer containing a polymerizable monomer; and
at least one adjacent layer which is in contact with the volume hologram recording layer and contains a resin,
wherein a diffraction grating is formed so as to extend from the volume hologram recording layer to the adjacent layer;
wherein the photosensitive layer is formed by coating a photosensitive composition containing a polymerizable monomer on the adjacent layer followed by drying; and
wherein a holographic exposure is carried out for the photosensitive layer in a state in which part of the photosensitive composition of the photosensitive layer has infiltrated the adjacent layer.

2. The holographic optical element according to claim 1, wherein the density of the adjacent layer is 1.20 to 1.38 g/cm$^3$.

3. The holographic optical element according to claim 2, wherein the density of the adjacent layer is 1.30 to 1.35 g/cm$^3$.

4. The holographic optical element according to claim 3, wherein the adjacent layer contains cellulose acylate.

5. The holographic optical element according to claim 4, wherein the cellulose acylate has a benzoyl group.

6. The holographic optical element according to claim 2, wherein the adjacent layer contains cellulose acylate.

7. The holographic optical element according to claim 6, wherein the cellulose acylate has a benzoyl group.

8. The holographic optical element according to claim 1, wherein the adjacent layer contains cellulose acylate.

9. The holographic optical element according to claim 8, wherein the cellulose acylate has a benzoyl group.

10. A method for producing a holographic optical element, comprising, after forming a photosensitive layer containing a polymerizable monomer on an adjacent layer containing a resin, performing holographic exposure for the photosensitive layer to form a volume hologram recording layer;
wherein the photosensitive layer is formed by coating a photosensitive composition containing the polymerizable monomer on the adjacent layer followed by drying; and
wherein the holographic exposure is carried out for the photosensitive layer in a state in which part of the photosensitive composition of the photosensitive layer has infiltrated the adjacent layer.

11. The method for producing a holographic optical element according to claim 10, wherein the density of the adjacent layer is 1.20 to 1.38 g/cm$^3$.

12. The method for producing a holographic optical element according to claim 11, wherein the density of the adjacent layer is 1.30 to 1.35 g/cm$^3$.

13. The method for producing a holographic optical element according to claim 10, wherein the adjacent layer contains cellulose acylate.

14. The method for producing a holographic optical element according to claim 13, wherein the cellulose acylate has a benzoyl group.

* * * * *